United States Patent
Virag et al.

(10) Patent No.: US 12,401,541 B2
(45) Date of Patent: Aug. 26, 2025

(54) CLASSIFIER REDUCTION FOR LOW LATENCY DOCSIS

(71) Applicant: ARRIS Enterprises LLC, Horsham, PA (US)

(72) Inventors: David Virag, Johns Creek, GA (US); Parasuram Ranganathan, Brampton (CA); Arvind K. Rajapur, Bengaluru (IN)

(73) Assignee: ARRIS Enterprises LLC, Horsham, PA (US)

( * ) Notice: Subject to any disclaimer, the term of this patent is extended or adjusted under 35 U.S.C. 154(b) by 10 days.

(21) Appl. No.: 18/589,329

(22) Filed: Feb. 27, 2024

(65) Prior Publication Data
US 2024/0313996 A1    Sep. 19, 2024

Related U.S. Application Data

(60) Provisional application No. 63/453,019, filed on Mar. 17, 2023.

(51) Int. Cl.
*H04L 47/24* (2022.01)
*H04L 12/28* (2006.01)

(52) U.S. Cl.
CPC .......... *H04L 12/2801* (2013.01); *H04L 47/24* (2013.01)

(58) Field of Classification Search
None
See application file for complete search history.

(56) References Cited

U.S. PATENT DOCUMENTS

| | | | |
|---|---|---|---|
| 11,689,445 B2 * | 6/2023 | Nagarajan | H04L 45/38 709/238 |
| 11,706,124 B2 * | 7/2023 | Nagarajan | H04L 47/2483 709/238 |
| 11,991,560 B2 * | 5/2024 | Wheelock | H04W 28/0268 |
| 12,132,636 B2 * | 10/2024 | Clancy | H04L 43/55 |
| 2018/0343206 A1 * | 11/2018 | White | H04L 47/11 |
| 2019/0158371 A1 * | 5/2019 | Dillon | H04L 47/196 |
| 2019/0274064 A1 | 9/2019 | Chapman et al. | |
| 2020/0053018 A1 * | 2/2020 | White | H04L 47/6275 |
| 2020/0112504 A1 * | 4/2020 | Osman | H04L 61/256 |
| 2021/0029049 A1 * | 1/2021 | Assouline | H04L 47/621 |
| 2022/0150153 A1 * | 5/2022 | Clancy | H04L 43/55 |
| 2022/0200890 A1 | 6/2022 | Nagarajan et al. | |
| 2022/0200899 A1 * | 6/2022 | Nagarajan | H04L 45/38 |
| 2022/0210080 A1 * | 6/2022 | Nagarajan | H04L 47/2441 |
| 2022/0295352 A1 * | 9/2022 | Wheelock | H04W 28/24 |
| 2022/0345439 A1 * | 10/2022 | Wheelock | H04L 43/0894 |
| 2023/0068269 A1 | 3/2023 | Nagarajan et al. | |

OTHER PUBLICATIONS

International Search Report and Written Opinion RE: Application No. PCT/US2024/017552, dated Jun. 5, 2024.

* cited by examiner

*Primary Examiner* — William J Kim
(74) *Attorney, Agent, or Firm* — Chernoff, Vilhauer, McClung & Stenzel, LLP

(57) ABSTRACT

Systems and methods for managing a limited number of classifiers implemented on an edge device of a DOCSIS network, such as a CMTS, where the classifiers are used to identify data communicated to and from a client device, and which is eligible for low latency service by the edge device.

20 Claims, 15 Drawing Sheets

CLASSIFIER REDUCTION FOR LOW LATENCY DOCSIS

CROSS REFERENCE TO RELATED APPLICATIONS

The present application claims the benefit of U.S. Provisional Patent Application Ser. No. 63/453,019 filed Mar. 17, 2024.

BACKGROUND

The present disclosure generally relates to Cable Television (CATV) networks. More particularly, but not exclusively, the present disclosure relates to provisioning low latency services in a CATV network compliant with the Low Latency Data Over Cable Service Interface Specification (Low Latency DOCSIS or LLD).

Cable Television (CATV) networks have historically provided content to large groups of subscribers from a central delivery unit, called a "head end", which distributes channels of content to the subscribers from the central delivery unit through a branch network comprising a multitude of intermediate nodes. Historically, the head end would receive a plurality of independent programming content and multiplex that content together while simultaneously modulating it according to a Quadrature Amplitude Modulation (QAM) scheme that maps the content to individual frequencies or channels to which a receiver may tune so as to demodulate and display desired content.

Modern CATV networks, however, not only provide media content such as television channels and music channels to a customer, but also provide a host of digital communication services such as Internet Service, Video-on-Demand, telephone service such as Voice over Internet Protocol (VOIP), and so forth. These digital communication services, in turn, require not only communication in a downstream direction from the head end, through the intermediate nodes and to a subscriber, but also require communication in an upstream direction from a subscriber, and to the content provider through the branch network.

To this end, the CATV head ends include a separate Cable Modem Termination System (CMTS) which is used to provide high speed data services, such as video, Internet, Voice over Internet Protocol (VOIP), etc. to cable subscribers. Typically, a CMTS includes both Ethernet interfaces (or other more traditional high-speed data interfaces) as well as Radio Frequency (RF) interfaces so that traffic coming from the Internet can be routed (or bridged) through the Ethernet interface, through the CMTS, and then onto the optical RF interfaces that are connected to the cable company's hybrid fiber coaxial (HFC) system. Downstream traffic is delivered from the CMTS to a Cable Modem (CM) placed in a subscriber's home, while upstream traffic is delivered from the cable modem back to the CMTS. Many modern CATV networks have combined the functionality of the CMTS with video delivery systems in a single platform called the Converged Cable Access Platform (CCAP). The foregoing architectures are typically referred to as centralized access architectures (CAA) because all of the physical and control layer processing is done at a central location, e.g., a head end.

Recently, distributed access architectures (DAA) have been implemented that distribute the physical layer processing, and sometimes the MAC layer processing deep into the network. Such systems include Remote PHY (or R-PHY) architectures, which relocate the physical layer (PHY) of a traditional CCAP by pushing it to the network's fiber optic nodes. Thus, while the core in the CCAP performs the higher layer processing, the R-PHY device in the node converts the downstream data sent by the core from digital-to-analog to be transmitted on radio frequency as a QAM signal, and converts the upstream RF data sent by cable modems from analog-to-digital format to be transmitted optically to the core. Other modern systems push other elements and functions traditionally located in a head end into the network, such as MAC layer functionality (R-MACPHY), etc. The devices such as CMTSs, RPDs, RMDs, etc. are referred to as "edge devices" since they are boundary devices that operate at the "edge" of the network that provides service to their subscribers, as well as the "edge" of a wider-area network such as the Internet or a satellite network that typically delivers packetized data to the edge device via e.g., an ethernet cable or satellite link.

Evolution of CATV networks, along with Data Over Cable Service Interface Specification (DOCSIS) standard, have typically been driven by increasing consumer demand for bandwidth, and more particularly growing demand for Internet and other data services. However, bandwidth is not the only consideration, as many applications such as video teleconferencing, gaming, etc. also require low latency. Thus, the DOCSIS 3.1 specifications incorporated low latency features, referred to as Low Latency DOCSIS (LLD), to enable lower latency and jitter for latency-sensitive applications. LLD essentially creates two separate service flows, where latency-sensitive traffic is carried over its own service flow that is prioritized over traffic that is not latency-sensitive.

Although the DOCSIS 3.1 standard allows for bifurcation of incoming traffic into low-latency service traffic and non-low-latency traffic using a set of downstream packet classifiers provisioned in a CMTS that is located in head end, as well as a set of upstream packet classifiers provisioned in a cable modem that is located in premises of a customer, the standard does not specify how the packet classifiers are provisioned in the CMTS/CM nor does it specify the model for bifurcating the packets into low-latency traffic and non-low-latency traffic or classic traffic. Hence, the provisioning of packet classifiers in the CMTS and the cable modem is still regarded as a major challenge for implementing LLD. Thus, there exists a need for solutions that enable efficient provisioning of packet classifiers for bifurcation of traffic into low-latency traffic and non-low-latency traffic.

The information disclosed in this background section is only for enhancement of understanding of the general background of the disclosure and should not be taken as an acknowledgement or any form of suggestion that this information forms the prior art already known to a person skilled in the art.

BRIEF DESCRIPTION OF THE DRAWINGS

The accompanying drawings, which are incorporated in and constitute a part of this disclosure, illustrate exemplary embodiments and, together with the description, serve to explain the disclosed principles. Some embodiments of system and/or methods in accordance with embodiments of the present subject matter are now described, by way of example only, and with reference to the accompanying figures.

Figure 1A:
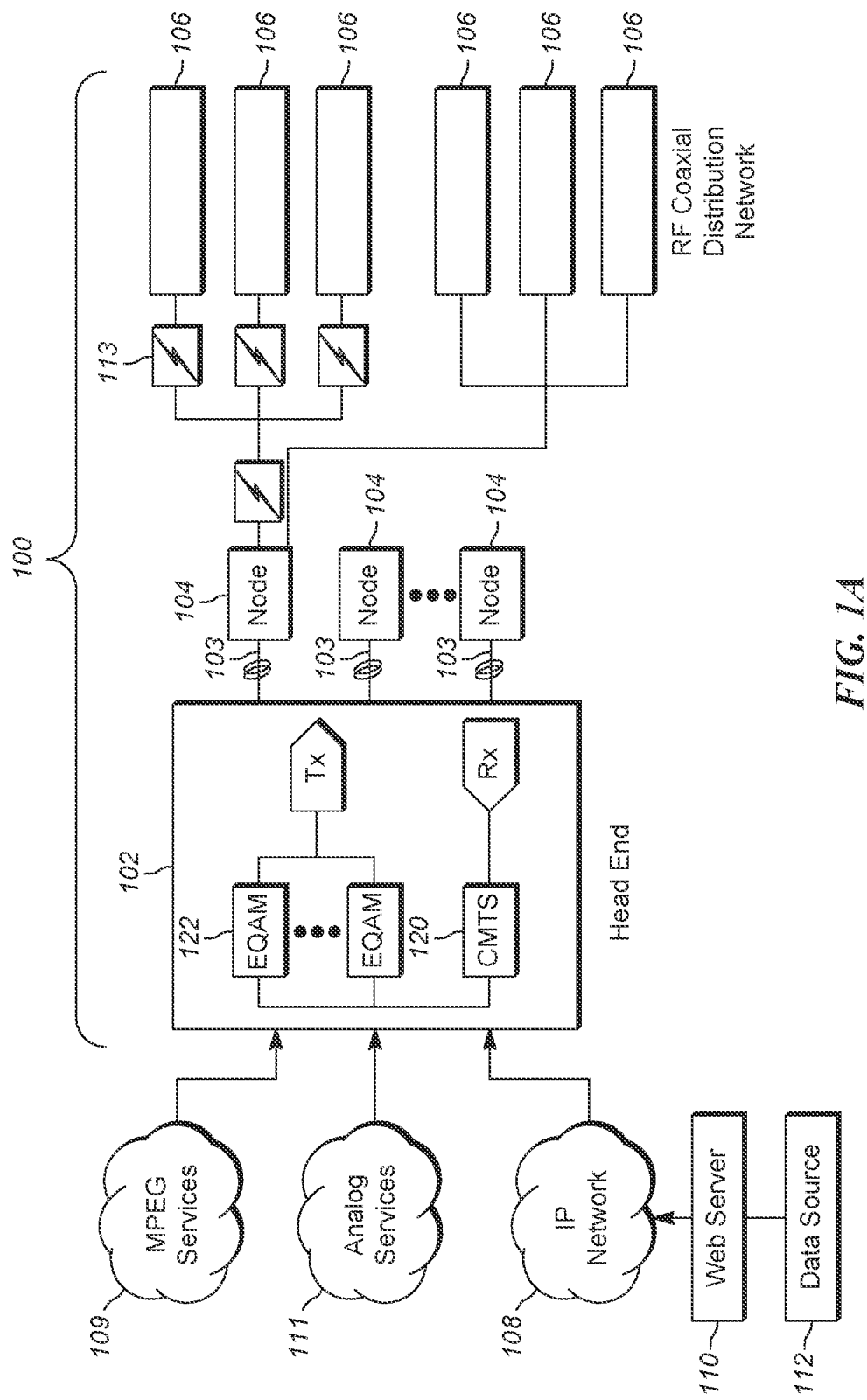
FIG. 1A shows an exemplary centralized access architecture (CAA) where the techniques of the present disclosure may be implemented, in accordance with some embodiments of the present disclosure.

It should be appreciated by those skilled in the art that any block diagrams herein represent conceptual views of the illustrative systems embodying the principles of the present subject matter. Similarly, it will be appreciated that any flowcharts, flow diagrams, state transition diagrams, pseudo code, and the like represent various processes which may be substantially represented in computer readable medium and executed by a computer or processor, whether or not such computer or processor is explicitly shown.

DETAILED DESCRIPTION

In the present document, the word "exemplary" is used herein to mean "serving as an example, instance, or illustration." Any embodiment or implementation of the present subject matter described herein as "exemplary" is not necessarily to be construed as preferred or advantageous over other embodiments.

While the disclosure is susceptible to various modifications and alternative forms, specific embodiment thereof has been shown by way of example in the drawings and will be described in detail below. It should be understood, however, that it is not intended to limit the disclosure to the particular form disclosed, but on the contrary, the disclosure is to cover all modifications, equivalents, and alternatives falling within the spirit and the scope of the disclosure.

The terms "comprise(s)", "comprising", "include(s)", or any other variations thereof, are intended to cover a non-exclusive inclusion, such that a setup, device, apparatus, system, or method that comprises a list of components or steps does not include only those components or steps but may include other components or steps not expressly listed or inherent to such setup or device or apparatus or system or method. In other words, one or more elements in a device or system or apparatus proceeded by "comprises . . . a" does not, without more constraints, preclude the existence of other elements or additional elements in the system.

In the context of present disclosure, a packet flow may be defined as a flow of Internet Protocol (IP) packets or data packets between an application server and a subscriber device through a specific port number or a specific port range.

In the following detailed description of the embodiments of the disclosure, reference is made to the accompanying drawings that form a part hereof, and in which are shown by way of illustration of specific embodiments in which the disclosure may be practiced. These embodiments are described in sufficient detail to enable those skilled in the art to practice the disclosure, and it is to be understood that other embodiments may be utilized and that changes may be made without departing from the scope of the present disclosure. The following description is, therefore, not to be taken in a limiting sense. In the following description, well known functions or constructions are not described in detail since they would obscure the description with unnecessary detail.

The present disclosure describes methods, systems, apparatuses, and computer readable media for provisioning low latency services in a Cable Television (CATV) network compliant with the Low Latency DOCSIS or LLD standard. The methods, systems, and apparatuses disclosed in the present application may be implemented with respect to a communications network that provides data services to consumers, regardless of whether the communications network is implemented as a CAA architecture or a DAA architecture, as shown respectively in FIGS. 1A and 1B.

FIG. 1A shows an exemplary centralized access architecture (CAA) where the techniques of the present disclosure may be implemented. Specifically, FIG. 1A illustrates an exemplary Cable Television (CATV) network infrastructure comprising a Hybrid Fiber Coaxial (HFC) broadband network 100 that combines use of optical fiber and coaxial connections. The HFC network 100 includes a head end 102 that receives analog or digital video signals and digital bit streams representing different services (e.g., video, voice, and Internet) from various digital information sources. For example, the head end 102 may receive content from one or more video on demand (VOD) servers, Internet Protocol television (IPTV) broadcast video servers, Internet video sources, or other suitable sources for providing IP content.

As shown in FIG. 1A, the CATV network infrastructure includes an IP network 108, MPEG services 109, and analog services 111. The IP network 108 may further include a web server 110 and a data source 112 comprising IP content. The web server 110 may be a streaming server that uses the IP protocol to deliver video-on-demand, audio-on-demand, and pay-per view streams to the IP network 108. The IP data source 112 may be connected to a regional area or backbone network (not shown) that transmits IP content to the IP data source 112. For example, the regional area network may be or include the Internet or an IP-based network, a computer network, a web-based network, or other suitable wired or wireless network or network system.

At the head end 102, the services described above are encoded, modulated and up-converted onto RF carriers, combined onto a single electrical signal, and inserted into a broadband optical transmitter. A fiber optic network extends from the cable operator's master/regional head end 102 to a plurality of fiber optic nodes 104 (also known as "field optical nodes"). The head end 102 may contain an optical transmitter or transceiver to provide optical communications through optical fibers 103. Regional head ends and/or neighborhood hub sites may also exist between the head end 102 and one or more nodes. The fiber optic portion of the example HFC network 100 extends from the head end 102 to the regional head end/hub and/or to the plurality of fiber optic nodes 104. The optical transmitter converts the electrical signal to a downstream optically modulated signal that is sent to the fiber optic nodes 104. In turn, the fiber optic nodes 104 convert inbound signals to RF energy and return RF signals to optical signals along a return path. In the specification, the drawings, and/or the claims, the terms "forward path" and "downstream" may be interchangeably used to refer to a path from a head end to a node, a node to a subscriber, or a head end to a subscriber. Conversely, the terms "return path", "reverse path" and "upstream" may be interchangeably used to refer to a path from a subscriber to a node, a node to a head end, or a subscriber to a head end.

Each fiber optic node 104 serves a service group comprising one or more customer locations. By way of example, a single fiber optic node 104 may be connected to thousands of cable modems or other subscriber devices 106. In an example, a fiber optic node 104 may serve thousands or more customer premises. In an HFC network 100, the fiber optic node 104 may be connected to a plurality of subscriber devices 106 via coaxial cable cascades. Though those of ordinary skill in the art will appreciate that the coaxial cable cascade may comprise a combination of fiber optic cable and coaxial cable. In some implementations, each fiber optic node 104 may include a broadband optical receiver to convert the downstream optically modulated signal received from the head end 102 or a hub to an electrical signal provided to the subscribers' devices 106 through the coaxial cable cascade. Signals may pass from the fiber optic node 104 to the subscriber devices 106 via the coaxial cable cascade which may be comprised of multiple amplifiers 113 and active or passive devices including cabling, taps, splitters, and in-line equalizers. It should be understood that the amplifiers 113 in the coaxial cable cascade may be bidirectional, and may be cascaded such that an amplifier may not only feed an amplifier further along in the cascade but may also feed a large number of subscribers. In general, a tap is a customer's drop interface to a coaxial distribution system and taps are designed in various values to allow amplitude consistency along the coaxial distribution system.

The subscriber devices 106 may reside at a customer location, such as a home of a cable subscriber, and are connected to a cable modem termination system (CMTS) 120 or comparable component located in the head end 102. A subscriber device 106 may be a modem, e.g., a Cable Modem (CM), a media terminal adaptor (MTA), a set top box, a terminal device, a television equipped with a set top box, a Data Over Cable Service Interface Specification (DOCSIS) terminal device, a customer premises equipment (CPE), a router, or similar electronic client, or terminal devices of subscribers. For example, cable modems and IP set top boxes may support data connection to the Internet and other computer networks via the HFC network 100, and the HFC network 100 provides bi-directional communication systems in which data can be sent downstream from the head end 102 to a subscriber and upstream from a subscriber to the head end 102.

References are made in the present disclosure to a Cable Modem Termination System (CMTS) 120 in the head end 102. In general, the CMTS 120 is a component located at the head end 102 or a hub site of the CATV network infrastructure that exchanges signals between the head end 102 and subscriber devices 106 within the CATV network infrastructure. In an example DOCSIS arrangement, for example, the CMTS 120 and the cable modem may be the endpoints of the DOCSIS protocol, with a hybrid fiber coaxial (HFC) cable transmitting information between these endpoints. It will be appreciated that the HFC network 100 includes one CMTS 120 for illustrative purposes only and, in general, multiple CMTSs and their Cable Modems may be managed through the single HFC network 100.

The CMTS 120 may host downstream and upstream ports and may contain numerous receivers, each receiver handling communications between hundreds of end user network elements connected to the HFC network 100. For example, each CMTS 120 may be connected to several cable modems of many subscribers, e.g., a single CMTS may be connected to hundreds of cable modems that vary widely in communication characteristics. In many instances several nodes, such as fiber optic nodes 104, may serve a particular area of a town or city. DOCSIS enables IP data packets to pass between devices on either side of a link between the CMTS 120 and the cable modem.

It should be understood that the CMTS 120 is a non-limiting example of a component in the CATV network infrastructure that may be used to exchange signals between the head end 102 and the subscriber devices 106 within the CATV network infrastructure. For example, other non-limiting examples of components used to exchange signals between the head end 102 and the subscriber devices 106 within the CATV network infrastructure may also include a Modular CMTS (M-CMTS) architecture or a Converged Cable Access Platform (CCAP).

The head end 102 or hub device may comprise at least one Edge Quadrature Amplitude Modulators (EdgeQAM or EQAM) 122 or EQAM modulator for receiving packets of digital content, such as video or data, re-packetizing the digital content into an MPEG transport stream, and digitally modulating the transport stream onto a downstream RF carrier using Quadrature Amplitude Modulation (QAM). EQAMs 122 may be used for both digital broadcast, and DOCSIS downstream transmission. In CMTS or M-CMTS implementations, data and video QAMs may be implemented on separately managed and controlled platforms. In CCAP implementations, the CMTS and edge QAM functionality may be combined in one hardware solution, thereby combining data and video delivery.

Figure 1B:
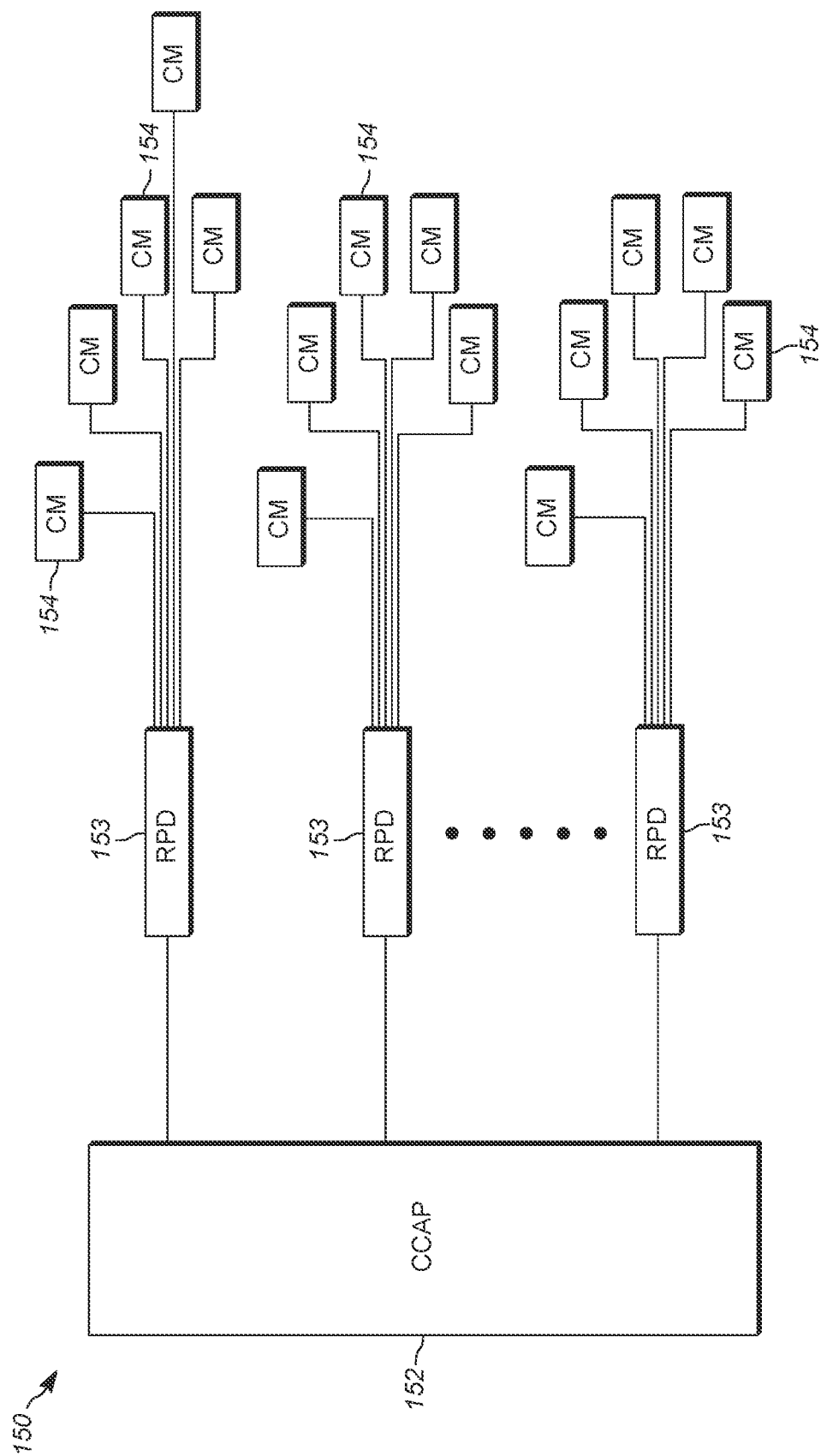
FIG. 1B an exemplary distributed access architecture (DAA) where the techniques of the present disclosure may be implemented, in accordance with some embodiments of the present disclosure.

Referring now to FIG. 1B, which illustrates an exemplary distributed access architecture (DAA architecture e.g., a R-PHY architecture, although other DAA architectures may include R-MACPHY architectures, optical line terminal architectures (R-OLT architectures), etc. Specifically, a distributed CATV network architecture 150 may include a Converged Cable Access Platform (CCAP) 152 at a head end connected to a plurality of cable modems (CMs) 154 via a branched transmission network that includes a plurality of Remote PHY device (RPD) nodes 153. The RPD nodes 153 perform the physical layer processing by receiving downstream, typically digital, content via a plurality of northbound ethernet ports and converting the downstream to QAM modulated signals where necessary, then propagating the content as RF signals on respective southbound ports of a coaxial network to the cable modems 154. In the upstream direction, the RPD nodes 153 receive upstream content via the southbound RF coaxial ports, convert the upstream content to optical data stream in optical domain, and transmit the optical data stream to the CCAP 152. The architecture of FIG. 1A is shown as an R-PHY system where the CMTS 120 operates as the CCAP 152 while the RPDs 153 are located downstream, but alternate systems may use a traditional CCAP operating fully in an Integrated CMTS in a head end, connected to the cable modems 154 via a plurality of nodes/amplifiers.

The techniques disclosed herein may be applied to systems and networks compliant with DOCSIS. Cable industry developed the international Data Over Cable System Interface Specification (DOCSIS) standard or protocol to enable delivery of IP data packets over cable networks. In general, DOCSIS defines communications and operations support interface requirements for a data over cable system. For example, DOCIS defines the interface requirements for cable modems involved in high-speed data distribution over CATV networks. However, it should be understood that the techniques disclosed herein may apply to any system for digital services transmission, such as digital video or Ethernet PON over Coax (EPOC). Examples herein referring to DOCSIS are illustrative and representative of the application of the techniques to a broad range of services carried over coax.

As noted earlier, although CATV network architectures have historically evolved in response to increasing consumer demand for bandwidth, many applications such as video teleconferencing, video streaming, online gaming, etc. also require low latency. Specifically, certain services cannot be further improved simply by adding additional bandwidth. Such services include web meetings and live video as well as online gaming or medical applications. For these applications, latency as well as jitter (which can be thought of as variation in latency) are at least equally important as bandwidth.

For instance, in online gaming applications that involve multiple players competing and collaborating over a common server, latency has an arguably greater impact on gameplay than bandwidth. In this fast-paced environment, millisecond connection delays are the difference between success and failure. As such, low latency is a well-recognized advantage in online multiplayer games. With lower latency (i.e., the time that packets spend reaching gaming server and returning a response to the multiplayer gamer), players can literally see and do things in the game before others can. The same analysis can be applied to finance and day trading, as well as myriad other applications.

End-to-end latency has several contributing causes, the most obvious being propagation delay between a sender and a receiver; however, many other causes of latency are at least as significant. For example, a gaming console itself introduces approximately 50 ms of latency, and creating an image on-screen by a computer or console takes between 16 ms to 33 ms to reach the screen over a typical High-Definition Multimedia Interface (HDMI) connection. However, the most significant source of latency is queuing delay, typically within the networks as shown in FIGS. 1A and 1B. As most applications rely on Transmission Control Protocol (TCP) or similar protocols, which emphasize optimizing bandwidth, 'congestion avoidance' algorithms in the access networks usually adjust to a link based on its speed. Buffers and queues on that link are stressed to the limit, which optimizes bandwidth but increases latency.

Typically, all network traffic merges into a single DOCSIS service flow. This network traffic includes both streams i.e., streams that build queues (like video streaming applications) and streams that do not build queues (like multiplayer gaming applications). The applications that build queues (e.g., video streaming applications) may be referred to as "queue building applications" and the streams or flows associated with the queue building applications may be referred to as "classic service flows" or "classic SF" or "normal service flows". Similarly, the applications that do not build queues (e.g., online gaming applications) may be referred to as "non-queue building applications" and the streams or flows associated with the non-queue building applications may be referred to as "low-latency service flows" or "low latency SF". The challenge that the single-flow architecture presents is a lack of distinction between the two types of flows. Both a gaming application and a video streaming application are treated the same by the network, but their needs are very different. A queueing delay might not matter for the purpose of watching a YouTube video, which can buffer and play asynchronously, but for competing in a multiplayer online game, having data packets held in a queue is a meaningful disadvantage. This indiscriminate treatment of traffic on today's DOCSIS networks adds latency and jitter precisely where it is unwanted.

To reduce the latency and jitter in the CATV networks, a new feature has been introduced called Low Latency DOCSIS (LLD). The LLD architecture addresses queuing latency using a dual queuing approach. Applications that are not queue building (such as online gaming applications) will use a different queue than traditional queue building applications (such as file downloads). Non-queue building traffic will use small buffers to minimize latency and queue building traffic will use larger buffers to maximize throughput. LLD therefore allows operators to provision low-latency services.

Specifically, the LLD architecture offers several new key features, including ASF (Aggregate Service Flow) service flow encapsulation, which manages traffic shaping of both service flows by enforcing an Aggregate Maximum Sustained Rate (AMSR), where the AMSR is the combined total of the low-latency and classic service flow bit rates, Proactive Grant Service scheduling, which enables a faster request grant cycle by eliminating the need for a bandwidth request, as well as other innovations such as Active Queue Management algorithms which drop selective packets to maintain a target latency.

Figure 1C:
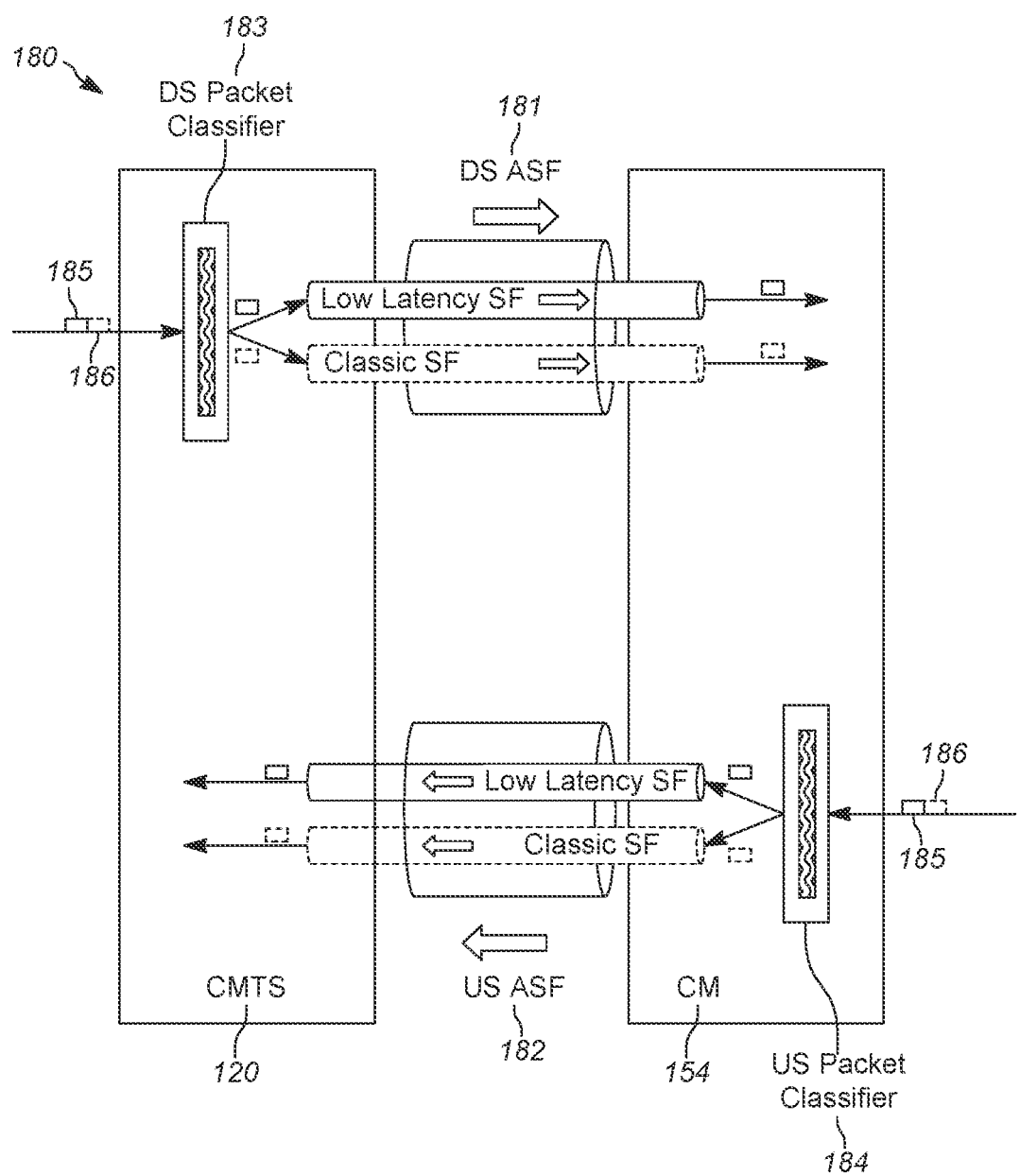
FIG. 1C shows an exemplary high level LLD service configuration indicating service flow traffic classification, in accordance with some embodiments of the present disclosure.

One other feature inherently necessary for LLD is service flow traffic classification i.e., classifying IP packets as belonging either to the Classic service flow or the Low-Latency service flow, as shown in FIG. 1C, which shows a high level LLD service configuration 180 indicating service flow traffic classification in accordance with some embodiments of the present disclosure. As shown in FIG. 1C, the LLD service configuration 180 comprises a single downstream Aggregate Service Flow (DS ASF) 181 from the CMTS 120 to the CM 154 and a single upstream Aggregate Service Flow (US ASF) 182 from the CM 154 to the CMTS 120. Each of the downstream and upstream ASF comprises two individual service flows-one service flow for low latency traffic (also known as "low latency SF") and one service flow for classic traffic (also known as "classic SF"). The low latency SF may have a dedicated first traffic queue for handling low latency traffic and the classic SF may have a dedicated second traffic queue for handling classic service flows.

The CMTS 120 and the CM 154 may be provisioned with a plurality of LLD packet classifiers which segment the traffic of corresponding Aggregate Service Flow into the two service flows. Specifically, the CMTS 120 is preferably provisioned with a plurality of downstream LLD packet classifiers 183 which segment the incoming traffic from an application server such that matching IP packets 185 associated with non-queue building applications are transmitted over the Low Latency SF and non-matching IP packets 186 associated with queue building applications are transmitted over the Classic SF. Similarly, the CM 154 is provisioned with a plurality of upstream LLD packet classifiers 184 which segment the outgoing traffic from a subscriber device such that matching IP packets 185 associated with non-queue building applications are transmitted over the Low Latency SF and remaining non-matching IP packets 186 associated with queue building applications are transmitted over the Classic SF. In summary, the packet classifiers 183, 184 may classify IP packets of the Low latency SF as having high priority and IP packets of the Classic SF as having normal priority.

Though packet classification and configuring classifiers in the CMTS/CM play a crucial role in implementing LLD, the DOCSIS standard is silent on how the IP packets are classified and put onto the low latency service flow and how the packet classifiers are provisioned (or added) in the CMTS 120 and CM 154 for classifying and directing the IP packets to one of the low-latency SF or the Classic SF. Hence, the provisioning of packet classifiers in the CMTS 120 and CM 154 is still regarded as a major challenge for implementing the LLD services. This specification describes techniques of provisioning one or more packet classifiers to the CMTS 120 and CM 154, where a first LLD agent interacts with a second LLD agent for adding and/or deleting one or more packet classifiers onto the packets traversing the network between the CMTS 120 and CM 154.

In some implementations, the non-queue building (NQB) applications may mark packets as belonging to Low Latency SF. For instance, NQB applications such as online games may tag their IP packets with NQB Differentiated Services (DiffServ) value or support Explicit Congestion Notification (ECN) to indicate that they behave in a non-queue-building way so that one or more packet classifiers provisioned in the CMTS 120 and CM 154 (as shown in FIG. 1C) can easily classify their IP packets into the Low Latency SF. The packet classifiers may examine DiffServ Field and ECN Field, which are standard elements of the IPV4/IPv6 header. Specifically, IP packets with an NQB DiffServ value or an ECN field indicating either ECN Capable Transport or Congestion Experienced (CE) get mapped to the Low Latency SF and the rest of the IP packets are mapped to the Classic SF.

In other implementations, customer premises gateways may analyze IP packets to map selected IP packets onto the low-latency SF. Some other implementations may reliably identify IP packets in a service flow as being low latency packets, and in a manner that does not rely on specific hardware at either a subscriber device or a server (gaming server, financial server, etc.) communicating with that subscriber device. For instance, some implementations may employ a first, preferably cloud-hosted LLD agent 226 (as shown in FIGS. 2A-3B) that facilitates activating LLD services for subscribers. The first LLD agent identifies characteristics or "fingerprints" of low-latency traffic, and communicates those characteristics to a second, network-hosted LLD agent 228 (as shown in FIGS. 2A-3B) that may identify individual packets that match the "fingerprints" specified by the first LLD agent, and processes those packets to add appropriate data to the packets by which the one or more packet classifiers provisioned in the CMTS 120 and CM 154 (as shown in FIG. 1C) can identify and direct the packets to a respectively appropriate one of a low-latency SF or classic SF.

The first LLD agent 226 may identify the characteristics or "fingerprints" of the low-latency traffic in a number of desired manners. For example, the first LLD agent 226 may store a current list of non-queue building applications (e.g., online games) along with information such as IP addresses, ports, etc. of subscriber devices and servers. The first LLD 226 agent may receive information from a subscriber device or an application server indicating initiation of a particular non-queue building application and identify source and destination IP addresses/ports. Alternatively, the first LLD agent 226 may be provisioned with machine learning or artificial intelligence algorithms that enable the first LLD agent 226 to determine which traffic is low latency traffic, and also identify the source/destination IP and port addresses of traffic in such flows.

Figure 2A:
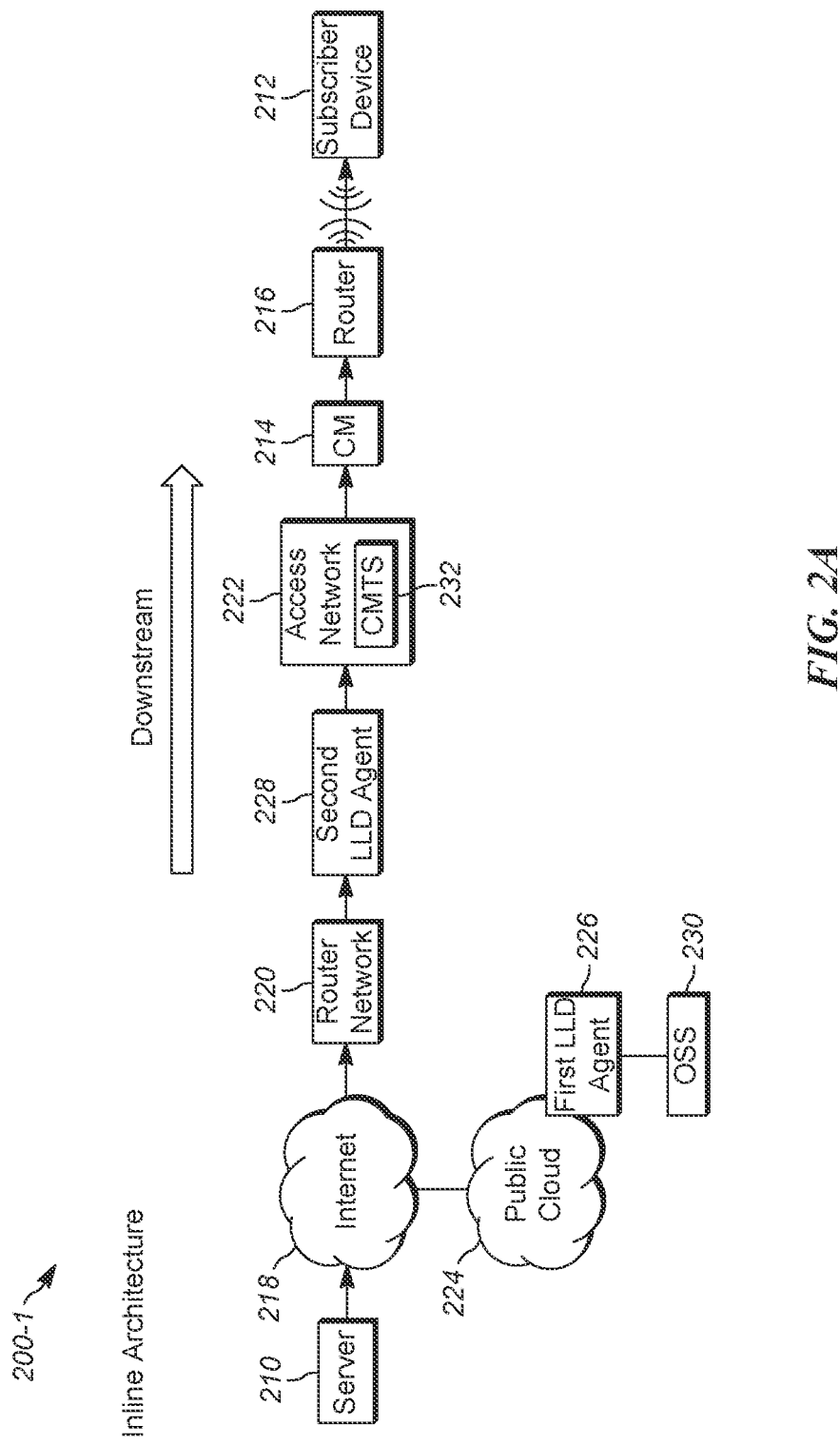
FIG. 2A shows an exemplary downstream traffic flow through a Cable Television (CATV) network implementing an inline architecture 200-1, in accordance with some embodiments of the present disclosure.
Figure 2B:
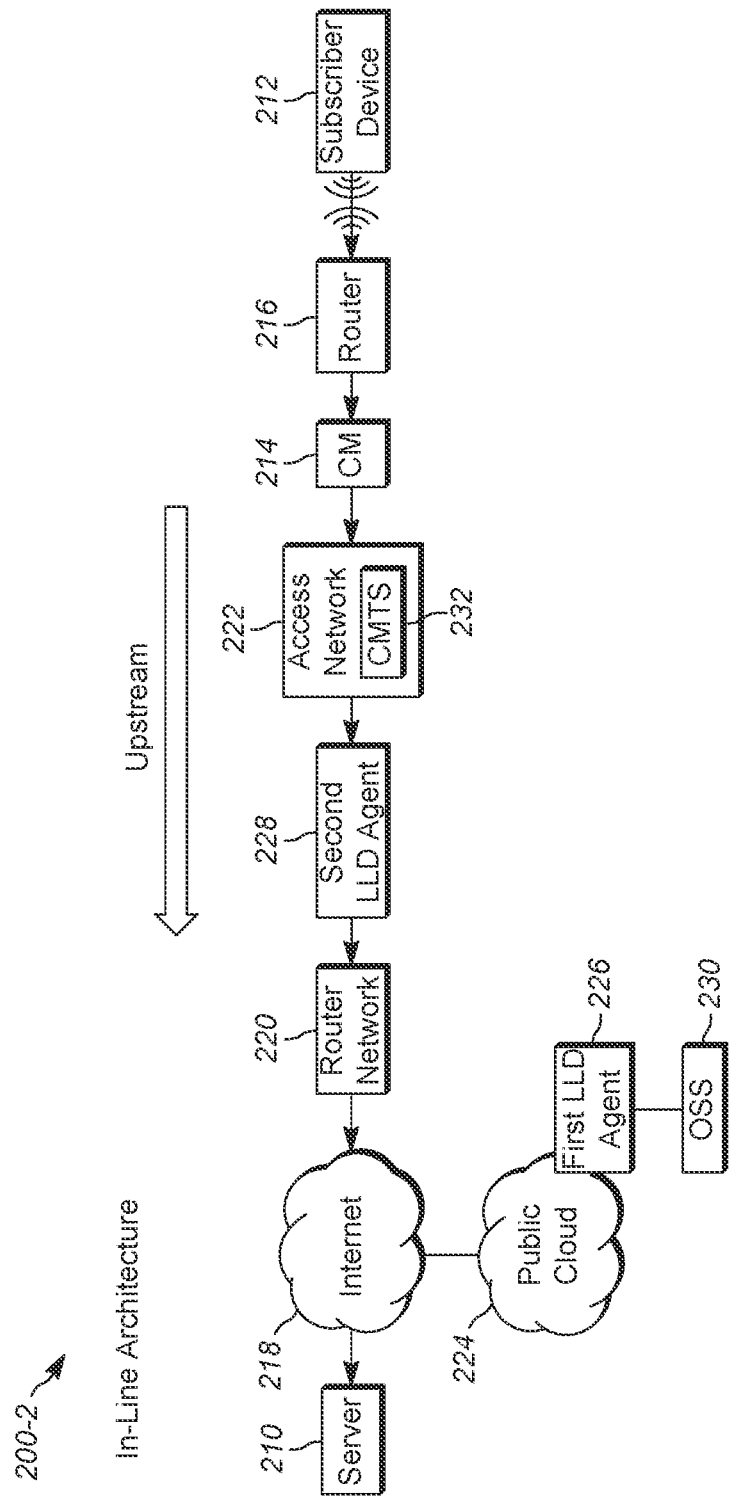
FIG. 2B shows an exemplary upstream traffic flow through a CATV network implementing an inline architecture, in accordance with some embodiments of the present disclosure.

Regardless of the particular manner in which the first LLD agent 226 identifies a low-latency flow, the first LLD agent 226 preferably uses the dynamic IP address and port numbers of the identified flows as the "fingerprints," and provide those fingerprints to the second LLD agent 228. The second LLD agent 228, in the in-line architecture 200 (as shown in FIGS. 2A-2B) uses those fingerprints to identify low latency traffic and process that traffic in a manner such that an access network 222 can recognize it as such and direct the low-latency traffic to the appropriate queues, etc. For the access network 222, the second LLD agent 228 may preferably communicate with the CMTS/RPD/RMD and/or CM to add classifiers to correspond to selected games or other applications selected by an end user, and thereby classify selected traffic into one of the low-latency SF or the classic SF. This addition of classifiers to the CMTS/CM may be accomplished using any of a variety of techniques.

For example, with respect to one embodiment, in the downstream direction, the second LLD agent 228 may preferably mark each packet identified as belonging to a low latency flow using a Type of Service (ToS) field. Specifically, Quality of Service (QOS) protocols for communications networks implement a Differentiated Service (DiffServ) solution that stores a value in the IP header of a data packet to indicate the priority a network should allocate to the packet relative to other packets. The IP header includes a Type of Service (ToS) field. The ToS field is an 8-bit identifier that was originally intended to store a six-bit value where the first three bits specified a precedence or importance value, the next three bits each specified a normal or improved handling for delay, throughput, and reliability, respectively, and the last two bits were reserved. In practice, however, the first three bits assigned for precedence were never used. Later, the DiffServ architecture specified the use of the ToS field to store a 6-bit code that indicates the precedence for a packet. The remaining two bits of the 8-bits are used to signal congestion control, defined by RFC3168. These bits may be modified by middle-boxes (or intermediary routers) and are used to signal congestion that may occur across the end-to-end path.

In some embodiments, the downstream classifier may be a single DSCP bit that identifies a packet as either belonging to a low latency flow or not belonging to a low latency flow. In other embodiments, more bit values may be used, particularly in systems that include varying levels of low latency. For example, some MSOs may wish to offer several tiers of low latency service, and the 8-bit ToS field may be used to classify each of these levels of service. In some embodiments, downstream traffic may also be tagged by the second LLD agent 228 for WiFi processing.

For upstream packets, these packets run from the client device 212/cable modem 214 through the access network 222. They can be identified by the second LLD agent 228 for upstream backbone processing based on Dynamic IP addresses, ports, etc. and marked as previously described. In some embodiments, upstream low-latency traffic may also be processed for anti-bleaching (i.e., to prevent ToS information from being overwritten or otherwise lost in the router network 220 or the Internet 218.

Those of ordinary skill in the art will appreciate that, although specific examples of information placed in the ToS field to identify and "fingerprint" low latency traffic included IP and port addresses, other information may also be used for that purpose. For example, such information could include a ToS mask, an IP protocol, an IP source address, an IP source mask, an IP destination address, an IP destination mask, an IP source port start and port end (allowing for a range of ports), a destination port start and port end (allowing for a range of ports), a destination MAC address, a source MAC address, an Ethernet/DSA/MAC type, a user priority (IEEE 802.1P), a virtual LAN identification (VLAN ID), or any other information useful in identifying a particular flow as being designated as low latency. An alternative technique of classifying packets as being eligible (or not eligible) for low latency treatment, and particularly in a port mirroring architecture as described below, would be for the second LLD agent 228 to program or instruct the CMTS as to the source/destination IP addresses/ports used for LLD-eligible traffic.

Figure 3A:
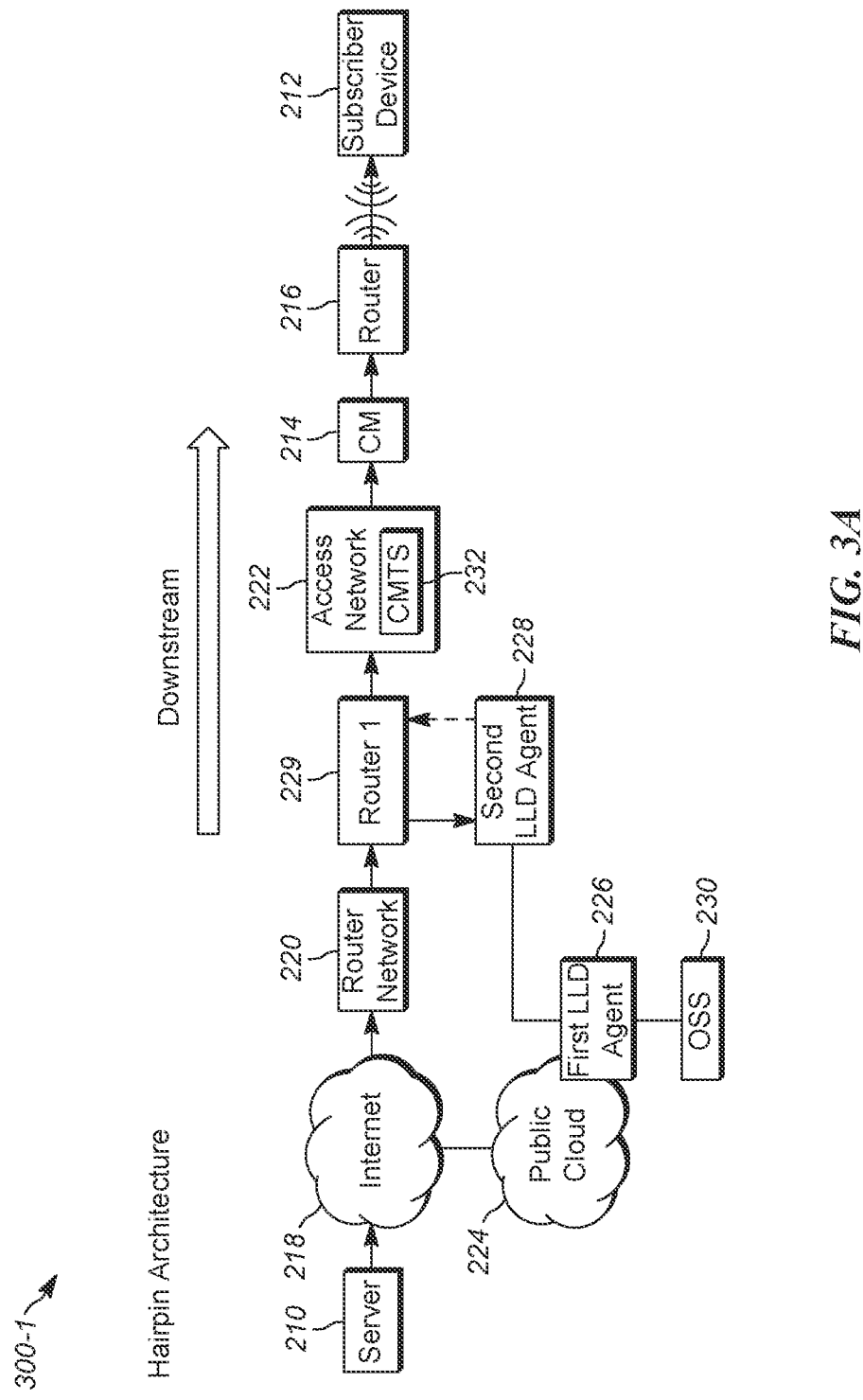
FIG. 3A shows an exemplary downstream traffic flow through a Cable Television (CATV) network implementing a hairpin architecture, in accordance with some embodiments of the present disclosure.
Figure 3B:
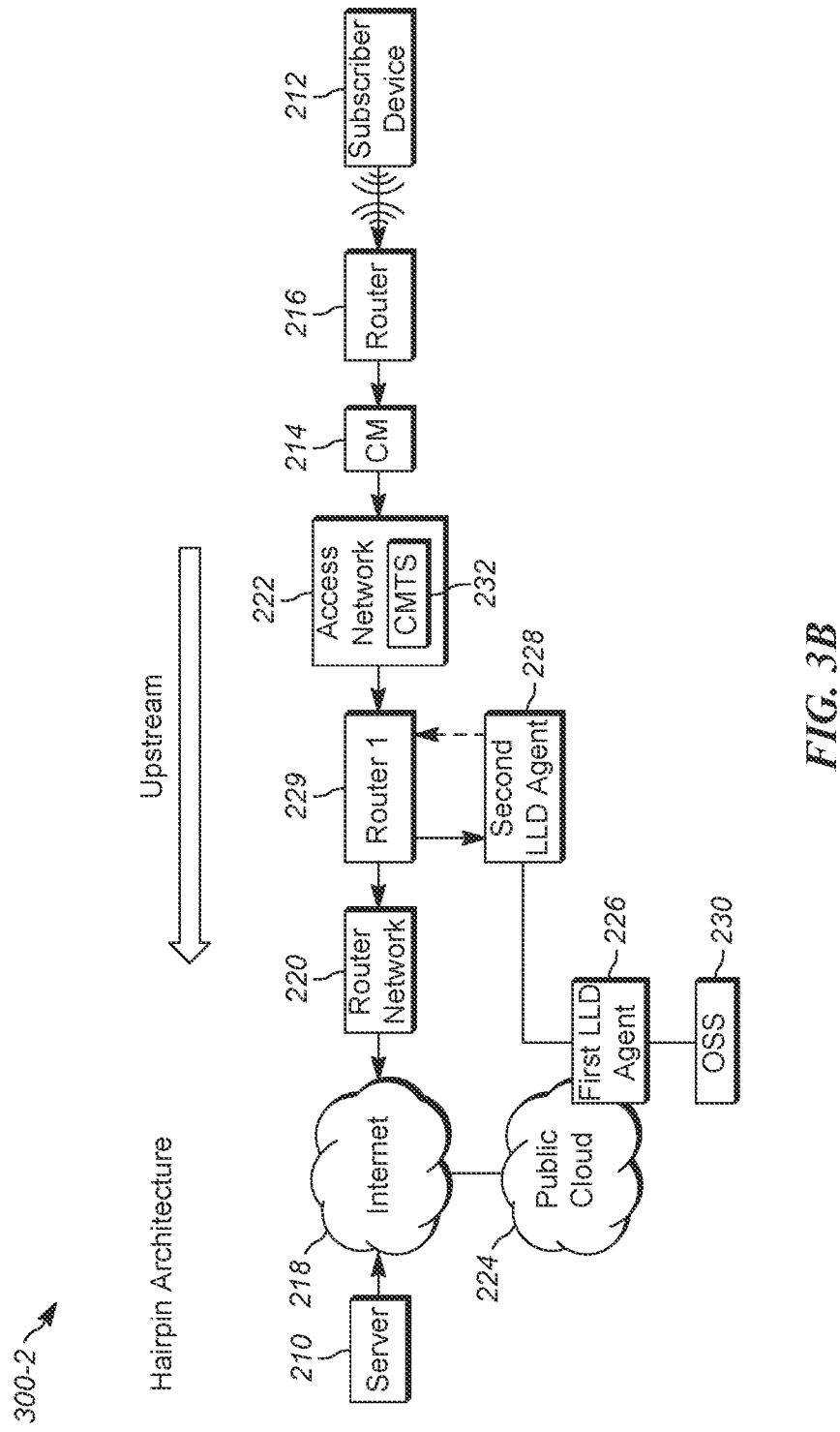
FIG. 3B shows an exemplary upstream traffic flow through a CATV network implementing a hairpin architecture, in accordance with some embodiments of the present disclosure.

In one non-limiting implementation, the second LLD DOCSIS agent 228 may be inserted in-line with the service flows in an an in-line architecture (as shown in FIGS. 2A and 2B). Alternately, in another non-limiting implementation, the second LLD DOCSIS agent 228 may be in a hairpin-style architecture where a router in the network diverts selected traffic to the second LLD agent 228 (as shown in FIGS. 3A and 3B). Specifically, an application server 210 (which may be for example, a gaming server, a financial server, a video conferencing server, and like) may be in communication with one or more subscriber devices 212, where each subscriber device 212 communicates with the application server 210 using an in-home gateway such as a Cable Modem (CM) 214 and optionally using a wireless router 216. IP packets communicated between a subscriber device 212 and the application server 210 are delivered via a wide-arca network 218 such as the Internet, an intervening router network 220, and an access network 222 (such as the network 100 shown in FIG. 1A or the network 150 shown in FIG. 1B). The access network 222 may comprise a CMTS 232. The CM 214 may be same as the CM 154 as discussed in conjunction with FIG. 1B and the CMTS 232 may be same as the CMTS 120 as discussed in conjunction with FIG. 1A.

In each of FIGS. 2A-3B, the first LLD agent 226 may be hosted by a service provider in a public cloud 224 or in alternative embodiments may be hosted in-house by a service provider. In either case, the first LLD agent 226 may communicate with the subscriber device 212, the application server 210, or the second LLD agent 228 via the Internet 218, the router network 220, and the access network 222 comprising the CMTS 232. In some embodiments, particularly in the hairpin implementations as shown in FIGS. 3A and 3B, the first LLD agent 226 and the second LLD agent 228 may be in direct communication without reliance on the Internet 218, etc. In one non-limiting embodiment, information collected or calculated by the first LLD agent 226 may be forwarded to quality assurance systems or other network functions hosted in an Operating Support System (OSS) 230 that may provide network optimization functions.

Referring specifically to FIGS. 2A and 2B, FIG. 2A shows a downstream traffic flow through a CATV network implementing an inline architecture 200-1 and FIG. 2B shows an upstream traffic flow through a CATV network implementing an inline architecture 200-2. The in-line architectures 200-1 and 200-2 may be collectively referenced by reference numeral 200. In the in-line architecture 200, the second LLD agent 228 is located in-line with the service flows, positioned between the router network 220 and the access network 222. In the downstream direction (as shown in FIG. 2A), all packets flowing between the access network 222 and the router network 220 pass through the second LLD agent 228 and the second LLD agent 228 processes all the packets flowing between the access network 222 and the router network 220 using the "fingerprints" provided by the first LLD agent 226 and statically add packet classifiers to packets eligible for low-latency treatment as they traverse the network from the CMTS 232 to the CM 214, and/or communicate with the CM 214 so that the CM 214 may add such packet classifiers to traffic traversing the network from the CM 214 to the CMTS 232, for bifurcating the IP packets into low-latency SF and classic SF. Similarly, in the upstream direction from the CMTS 232 (as shown in FIG. 2B), all packets pass through the second LLD agent 228. However, the problem with the in-line architecture 200 is that the second LLD agent 228 has to process all the traffic passing through it, which would require a relatively large amount of processing power on the part of the second LLD agent 228.

Referring to FIGS. 3A and 3B, alternate hairpin-type architectures 300-1 and 300-2 are shown, where the second LLD agent 228 is positioned outside of the direct flow between the subscriber device 212 and the application server 210. The hairpin architectures 300-1 and 300-2 may be collectively referenced by reference numeral 300. In these architectures, the second LLD agent 228 may use the "fingerprints" provided by the first LLD agent 226 to set the policies of a network element 229 or a router 229 of the router network 220 (indicated by the dashed line in FIGS. 3A and 3B), by which the router 229 can identify flows that should be forwarded to the second LLD agent 228, which in turn processes only those forwarded packets and marks them in a manner that enables the access network 222 to correctly route such packets in a low-latency service flow as defined by the DOCSIS standard. The second LLD agent 228 then returns the marked packets to the router 229 for further transit along the network. In this hairpin-style architecture 300, the second LLD agent 228 needs a relatively lower amount of processing power because it only needs to examine and process those packets that the router 229 forwards to it. Those of ordinary skill in the art sill recognize that the hairpin-style architecture 300 may instead divert packets to and from a CMTS, RPD, or other device in the access network 220 rather than the router 229. Moreover, those of ordinary skill in the art will appreciate that hairpin-type architectures 300-1 and 300-2 may in some embodiments perform classification for all packets forwarded to it by the router 229, or in alternate embodiments as described later with respect to FIG. 4B, may instead utilize control paths to a CMTS, cable modem, etc. to instruct or program such devices with information to identify low-latency-eligible traffic and add the classifiers themselves. In this latter embodiment, the second LLD agent 228 requires even less processing power than is required in the first embodiment.

Figure 4A:
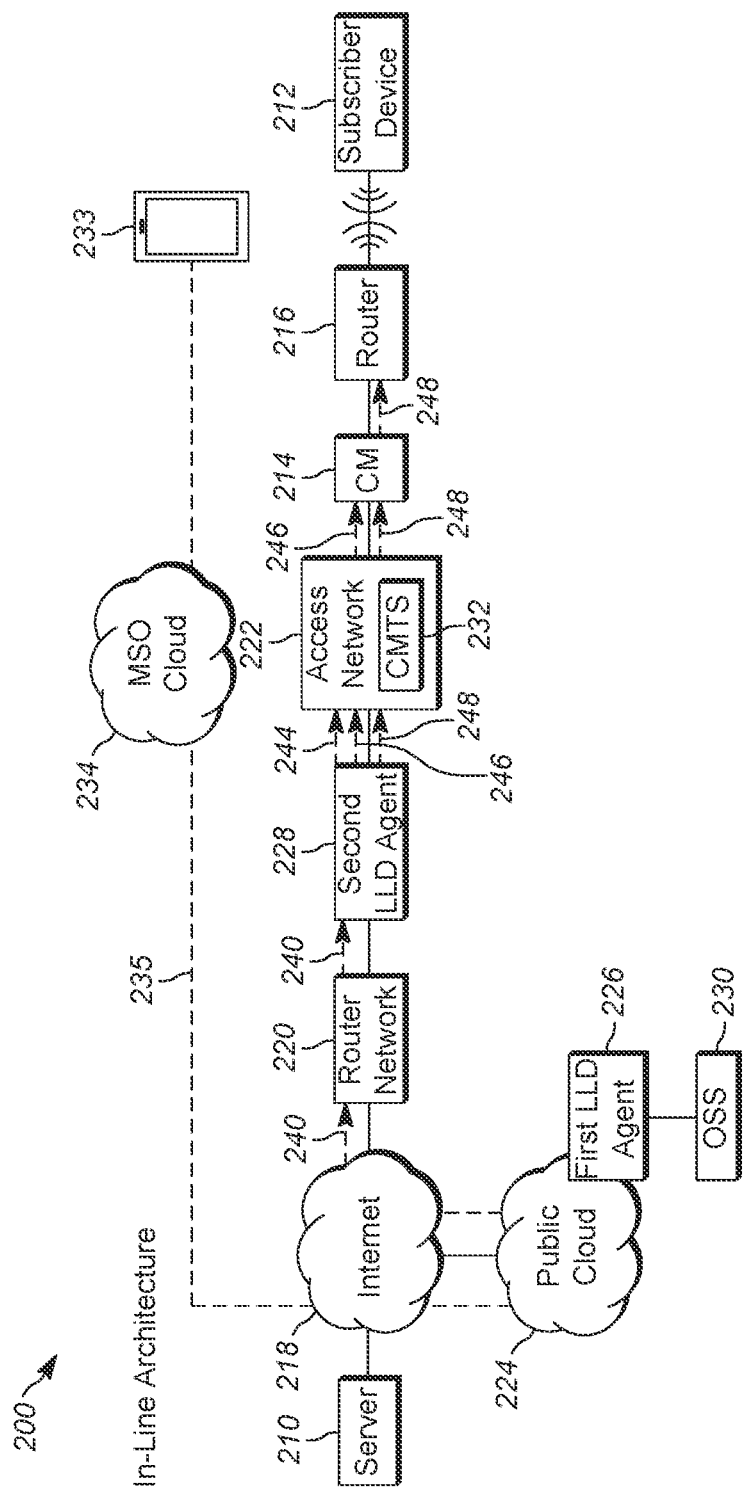
FIG. 4A shows exemplary upstream/downstream control flows in the in-line architecture, in accordance with some embodiments of the present disclosure.
Figure 4B:
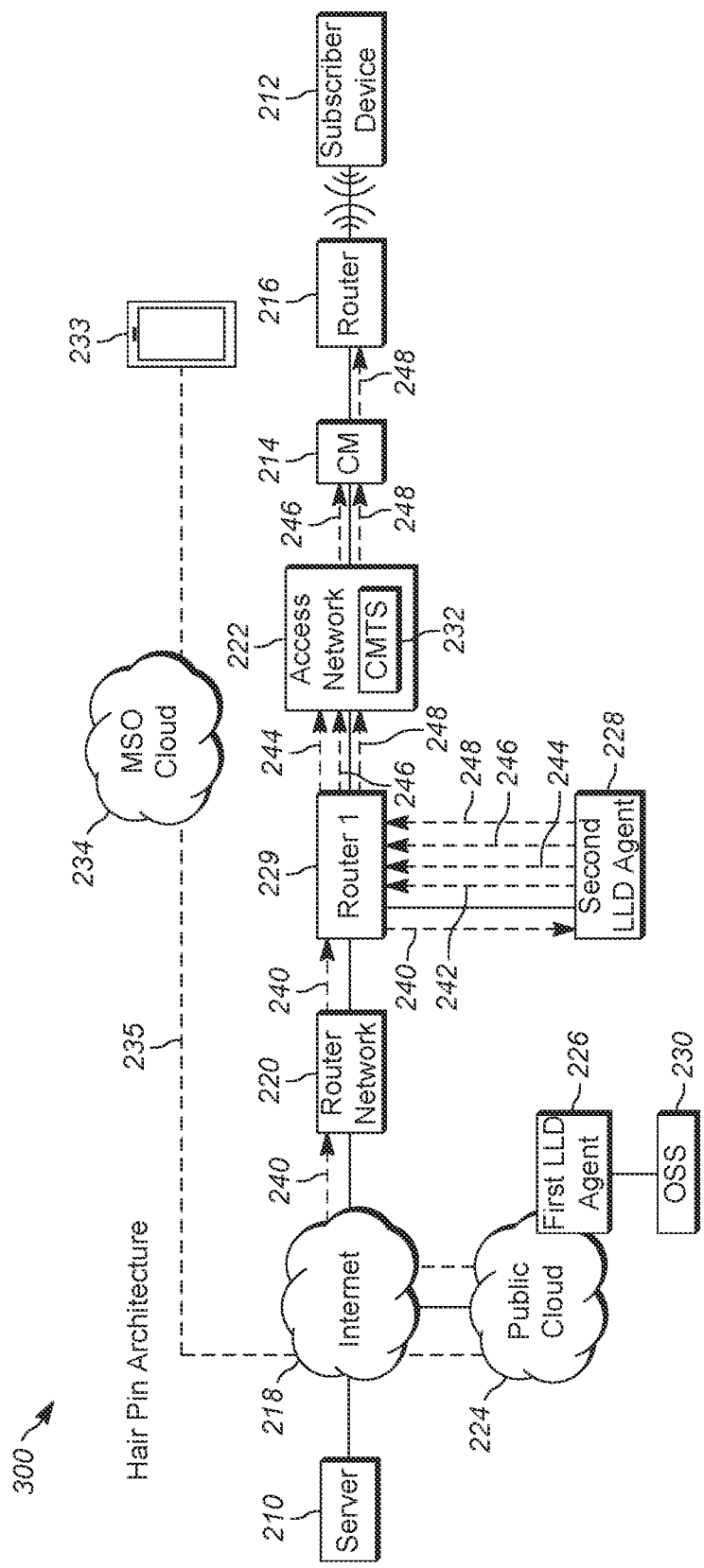
FIG. 4B shows exemplary upstream/downstream control flows in the hairpin architecture, in accordance with some embodiments of the present disclosure.

FIGS. 4A-4B show upstream/downstream control flows of the network architectures disclosed in FIGS. 2A-3B, in accordance with some embodiments of the present disclosure. Specifically, FIG. 4A shows upstream/downstream control flows in the in-line architecture 200 disclosed in FIGS. 2A-2B and FIG. 4B shows upstream/downstream control flows of the hairpin architecture 300 disclosed in FIGS. 3A-3B. In the in-line architecture 200 as shown in FIG. 4A, the second LLD agent 228 may use the fingerprints to identify low latency packets traversing the network and in the hairpin architecture 300 of FIG. 4B, the second LLD agent 228 may set policies in the router 229 to allow the router 229 to identify and divert selected traffic through the second LLD agent 228 using a control path 242. The second LLD agent 228 may also send control messages to the access network 222 (and specifically to the CMTS 232 inside the access network 222), the CM 214, and the router 216 via control paths 244, 246, and 248, respectively.

As shown in FIGS. 4A-4B, first a subscriber may subscribe to an LLD service. For subscribing to the LLD service, the subscriber may use a multiple-system operator (MSO) application or other software to make a selection via a client device 233 (in this case a cell phone), through an MSO cloud 234 and the Internet 218 to the first LLD agent 226, through communication path 235, to select at least one latency-sensitive software application (e.g., an online game, a video conferencing application, a video streaming application, or other application that requires low latency treatment). In one aspect, the subscriber may select a bundle of software applications that require low latency treatment. The first LLD agent 226 may interact with the second LLD agent 228 for activating the LLD service for the selected latency-sensitive application and adding one or more packet classifiers as previously described. In one non-limiting embodiment, the client device 233 and the subscriber device 212 may be the same, while in another embodiment the client device 233 may be different from the subscriber device 212.

The first LLD agent 226 may use its internal database of applications to identify the "fingerprints" associated with the selected latency-sensitive application and forward those fingerprints to the second LLD agent 228 via a control path 240. For example, the first LLD agent 226 may identify port numbers or port ranges (collectively referred to as "network ports") associated with the selected latency-sensitive application and forward the identified port numbers and port ranges to the second LLD agent 228 via the control path 240, as shown in FIGS. 4A-4B. In one embodiment, the first LLD agent 226 may identify the network ports associated with the selected latency-sensitive application based on a pre-stored list of applications along with information such as IP addresses, ports, etc. associated with the applications. In another embodiment, the first LLD agent 226 may identify the network ports associated with the selected latency-sensitive application based on machine learning or artificial intelligence (AI) solutions that enable the first LLD agent 226 to automatically identify the network ports associated with the selected latency-sensitive application. Regardless of the particular manner in which the first LLD agent 226 identifies the fingerprints associated with the selected latency-sensitive application, the first LLD agent 226 may provide the identified fingerprints to the second LLD agent 228.

As shown in FIGS. 4A-4B, the second LLD agent 228 may preferably interact with the access network 222 (and specifically with the CMTS 232 inside the access network 222) and the CM 214 via control paths 244 and 266 respectively to program one or more packet classifiers on the CMTS 232 and the CM 214. Specifically, the second LLD agent 228 may interact with the CMTS 232 using a Packet Cable Multimedia (PCMM) interface to program or add one or more downstream packet classifiers on the CMTS 232 such that for each network port associated with a selected latency-sensitive application, one downstream packet classifier is statically added on the CMTS 232. PCMM provides an interface for control and management of service flows for CATV network elements. PCMM interface enables operators to implement Quality of Service (QoS) via DOCSIS connections to deliver enhanced IP voice, video, data, gaming, and multimedia applications to subscribers. Similarly, the second LLD agent 228 may interact with the CM 214 using the PCMM interface to program or add one or more upstream packet classifiers on the CM 214 such that for each network port associated with the selected application, one upstream packet classifier is statically added on the CM 214. The one or more downstream packet classifiers segment the incoming traffic on the identified network ports of the CMTS 232 such that IP packets associated with the selected application are transmitted over the Low Latency SF and remaining IP packets are transmitted over the Classic SF. Similarly, the one or more upstream packet classifiers segment the outgoing traffic from the identified network ports on the CM 214 such that IP packets associated with the selected application are transmitted over the Low Latency SF and remaining IP packets are transmitted over the Classic SF.

It is worth noting that in the in-line and hairpin architectures of FIGS. 4A-4B the second LLD agent 228 preferably statically adds packet classifiers in the CMTS 232 and the CM 214 for all the port numbers and port ranges (i.e., network ports) which are associated with any selected latency-sensitive application(s). However, a selected application may not use all of the network ports all the time. Hence, adding packet classifiers on all of the network ports associated with selected latency-sensitive application would result in shortage of classifiers on the CMTS 232 and the CM 214 and unnecessarily waste resources on the CMTS 232 and the CM 214.

For example, assume that a subscriber sends a request to the first LLD agent 226 via the MSO cloud 234 and the Internet 218 for activating LLD service for one latency-sensitive gaming application. Upon receiving the request, the first LLD agent 226 may identify a list of port numbers and/or port ranges associated with the game. Assume that the port numbers and/or port ranges associated with the gaming application are 500, 3074, 3544, 4379-4380, and 27000-27031. The first LLD agent 226 may provide the port numbers and/or port ranges associated with the gaming application to the second LLD agent 228 via the control path 240, as shown in FIGS. 4A-4B. The second LLD agent 228 may then program five downstream packet classifiers on the CMTS 232 and five upstream packet classifiers on the CM 214 for classifying the packets associated with the gaming application onto the Low Latency SF. Also assume that out of the five port numbers and port ranges identified for the gaming application, only two port numbers/ports ranges (namely 3074 and 4379-4380) are actively used by the gaming application. Hence, adding packet classifiers on the three inactive ports/port ranges would waste resources on the CMTS 232 and the CM 214. Disclosed in this specification are solutions that dynamically identify those specific port numbers and/or port ranges that are actively used by a latency-sensitive application, and accordingly program the classifiers on the CMTS 232 and CM 214 only for those identified specific port numbers and/or port ranges.

Figure 5A:
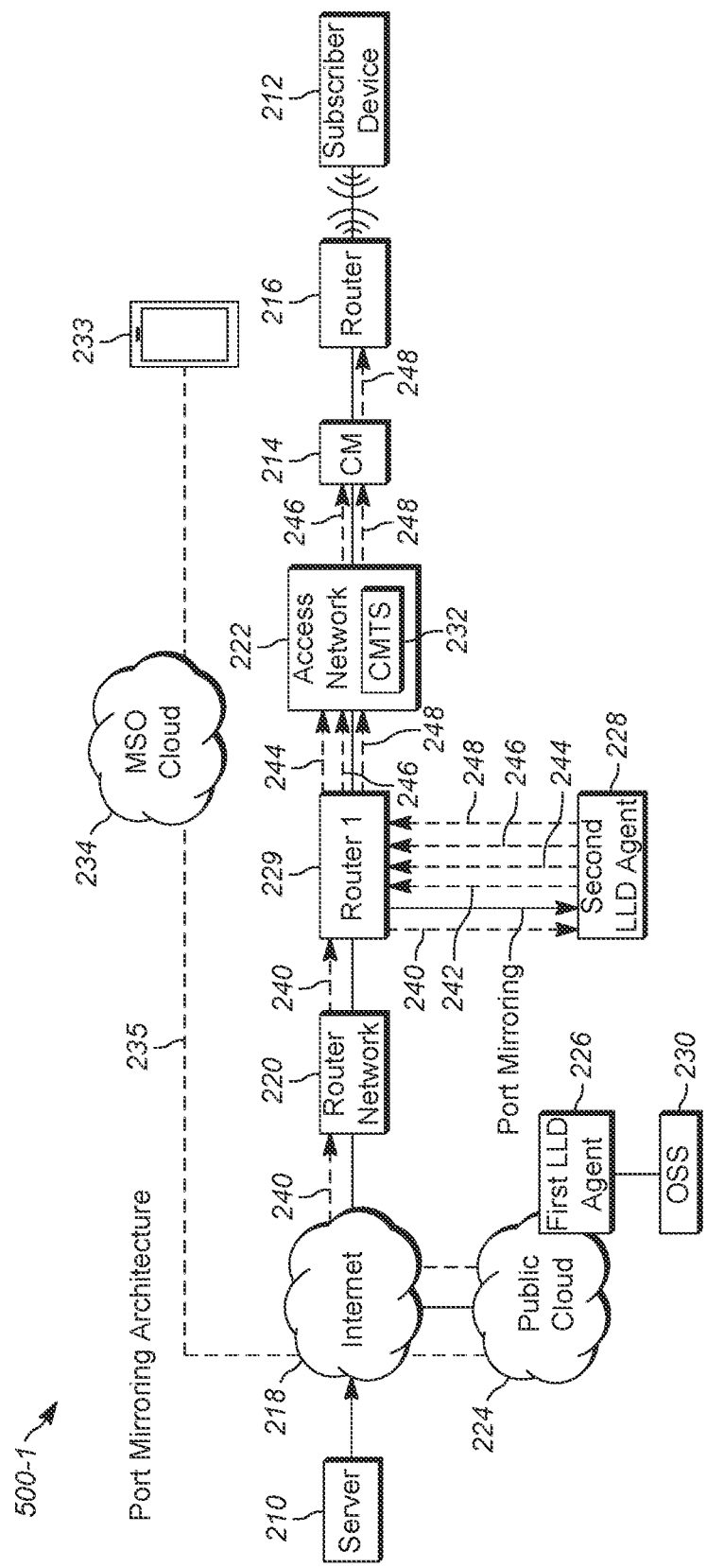
FIG. 5A shows exemplary upstream/downstream control flows in a port mirroring architecture, in accordance with some embodiments of the present disclosure.

In one non-limiting embodiment, in order to dynamically identify network ports actively used by the latency-sensitive application, the second LLD agent 228 may implement a port mirroring solution in the router 229 (as shown in a port mirroring architecture 500-1 of FIG. 5A) for mirroring packet flows passing through the router 229 to the second LLD agent 228. As shown in FIG. 5A, upon receiving the identified one or more network ports corresponding to the selected latency-sensitive application via the control path 240, the second LLD agent 228 may set policies in the router 229 via the control path 242 to allow the router 229 to mirror or duplicate entire packet flows (which correspond to the latency-sensitive application, and which pass through the identified one or more network ports) to at least one port of the second LLD agent 228. The second LLD agent 228 may continuously monitor the incoming packet flows and identify at least one network port of the one or more network ports which is actively used by the latency-sensitive application. The second LLD agent 228 may then interact with the CMTS 232 via the control path 244 to program one or more downstream packet classifiers and may interact with the CM 214 via the control path 246 to program one or more upstream packet classifiers on the CM 214, in the manner as discussed above in connection with FIGS. 4A-4B. This implementation of dynamically configuring the packet classifiers on the CMTS 232 and the CM 214 eliminates waste on the CMTS/CM. However, in such implementation, the second LLD agent 228 needs to monitor and process entire packet flows (corresponding to the latency-sensitive application) received from the router 229, which places a large processing burden on the second LLD agent 228 since processing all of the packet flows requires an inordinate amount of processing power on the part of the second LLD agent 228. Moreover, since the second LLD agent 228 is configured to serve thousands of customers requesting LLD services for different low-latency applications, it becomes inefficient and impractical to mirror entire flows of all low-latency applications used by the various subscribers, and doing so may strain resources at the second LLD agent 228.

Figure 5B:
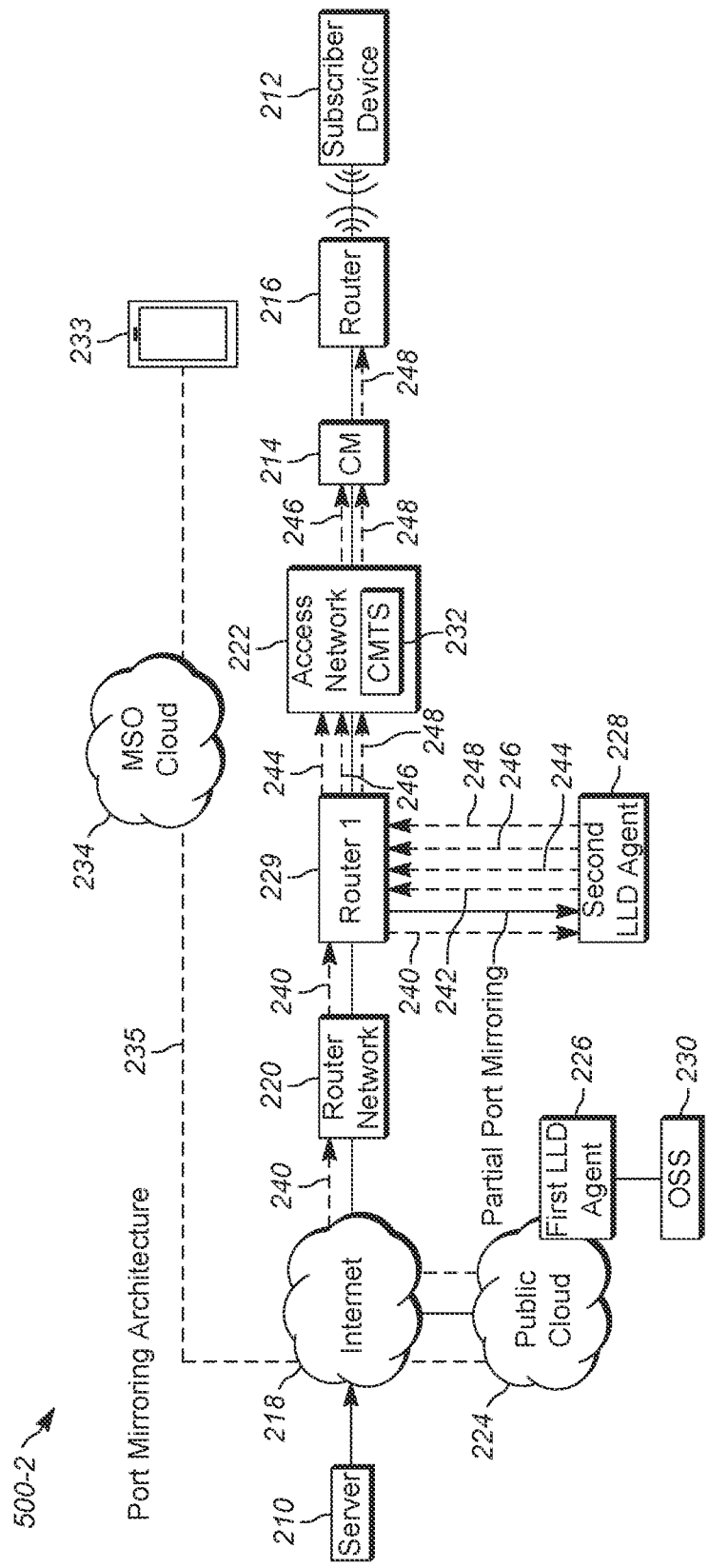
FIG. 5B shows exemplary upstream/downstream control flows in another port mirroring architecture implementing optimized port mirroring, in accordance with some embodiments of the present disclosure.

In one non-limiting embodiment of the present disclosure, in order to dynamically configure the packet classifiers on the CMTS 232 and the CM 214 while optimizing resource usage in the second LLD agent 228, the second LLD agent 228 may implement optimized mirroring solutions in the router 229, as described with respect to FIG. 5B.

Specifically, FIG. 5B shows upstream/downstream control flows in a port mirroring architecture 500-2 implementing optimized port mirroring in accordance with some embodiments of the present disclosure. As discussed above, first a subscriber may subscribe to an LLD service via an MSO application. The subscriber may transmit a request for activating LLD services for at least one latency-sensitive application (e.g., an online game or other application that requires low latency treatment). Upon receiving the request for activating LLD services, the first LLD agent 226 may identify the "fingerprints" i.e., port numbers or port ranges (collectively referred to as "one or more network ports") associated with the latency-sensitive application and forward the identified one or more network ports to the second LLD agent 228 via the control path 240.

Upon receiving the identified one or more network ports which may be used by the selected latency-sensitive application, the second LLD agent 228 may communicate with the router 229 and set one or more policies in the router 229 via the control path 242 to configure or enable the router 229 to partially mirror each packet flows (which corresponds to the latency-sensitive application and which pass through any of the identified one or more network ports) to at least one port of the second LLD agent 228. As used in this specification and the claims, the terms "partially mirror," "partial mirroring" etc. refer to mirroring of data in packet flows subject to one or more limitations, defined by policies imposed on the router 229 (by e.g., the second LLD agent 228, internal programming etc.) that restrict the mirrored amount of data to only a subset of the entirety of the data in packets that qualify for low-latency service as per the information provided by the first LLD agent 226. As one example of partial mirroring, as described later in the specification, the router 229 may be instructed or otherwise configured to only mirror packet data over a pre-defined interval e.g., a limited number of bytes, a limited number of packets, or for limited time duration, etc. Alternatively, as also described later in the specification, data packets that qualify for LLD service as per the information provided by the first LLD agent 226 may be initially mirrored by the router 229 to the second LLD agent 228, until the second LLD agent 228 instructs the router 229 to stop mirroring packets, even though data packets eligible for LLD-service are still flowing through the router 229.

Specifically, in one non-limiting embodiment of the present disclosure, the second LLD agent 228 may configure the router 229 to mirror a pre-defined number of initial data packets of each packet flow associated with the latency-sensitive application and passing through any of the identified one or more network ports. For instance, the second LLD agent 228 may instruct the router 229 using the control path 242 to mirror the first P data packets of each packet flow associated with the latency-sensitive application, where P is an integer greater than or equal to one. Whenever the second LLD agent 228 receives first P data packets of a particular packet flow of the latency-sensitive application and passing through a specific network port, it gives an indication to the second LLD agent 228 that packet flow has started on the specific network port for the latency-sensitive application. In one aspect, the value of P may be set as one i.e., the second LLD agent 228 may configure the router 229 to mirror the first data packet of each packet flow. In another aspect, in order to get a more reliable estimate of starting of packet flows (e.g., in case first few data packets of the packet flow are dropped for any reason), the value of P may be set to be more than one depending on network design and implementation.

In another non-limiting embodiment of the present disclosure, the second LLD agent 228 may configure the router 229 to mirror a predefined number or amount of data bytes of each packet flow associated with the latency-sensitive application and passing through any of the identified one or more network ports. For instance, the second LLD agent 228 may instruct the router 229 using the control path 242 to mirror the first Q bytes of data of each packet flow associated with the latency-sensitive application. Whenever the second LLD agent 228 receives first Q bytes of data of a particular packet flow of the latency-sensitive application and passing through a specific network port, it gives an indication to the second LLD agent 228 that a packet flow has started on the specific network port for the latency-sensitive application. Each IP packet of the packet flows comprises at least a header and data. The header includes the "fingerprints" of the IP packet i.e., source and destination IP addresses, port numbers, and other fields which help in routing the IP packet between the application server 210 and the subscriber device 212. Since the header helps in identifying the fingerprints of the IP packets, the second LLD agent 228 sets the value of Q such that the router 229 is configured to mirror the number of bytes sufficient to encompass the header of the first IP packet of each flow. In other words, the second LLD agent 228 sets the value of Q such that the router 229 is configured to mirror a portion of the first IP packet of each flow, where the portion includes the header of the first IP packet. In one aspect, the value of Q may be set as 100 bytes i.e., the second LLD agent 228 may configure the router 229 to mirror the first 100 bytes of each packet flow associated with the low latency application. In another aspect, in order to get a more reliable estimate of starting of the packet flows, the value of Q may be set to be more than 100 bytes depending on network design and implementation.

In another non-limiting embodiment of the present disclosure, the second LLD agent 228 may configure the router 229 to mirror data packets of each packet flow for a predefined time duration, where each packet flow is associated with the latency-sensitive application and passes through any of the identified one or more network ports. For instance, the second LLD agent 228 may instruct the router 229 using the control path 242 to mirror data packets of each packet flow for first R milliseconds. Whenever the second LLD agent 228 receives data packets of a particular packet flow for the first R milliseconds, it gives an indication to the second LLD agent 228 that packet flow has started on a specific network port associated with the particular packet flow of the latency-sensitive application. In one aspect, the value of R may be set as one i.e., the second LLD agent 228 may configure the router 229 to mirror data packets of each packet flow for the first 1 ms. In another aspect, in order to get a more reliable estimate of the start of packet flows, the value of R may be set to be more than one, depending on network design and implementation.

In this embodiment, the router 229 is configured to mirror data packets of each packet flow for the predefined time duration. However, sometimes the second LLD agent 228 may identify, even before the expiry of the predefined time duration, that a packet flow has started. Hence, in order to save resources, the second LLD agent 228 may actively instruct the router 229 to stop mirroring the data packets even though the predefined time duration has not yet expired. For example, assume that the predefined time duration is set to 10 ms but the second LLD agent 228 identifies during first 3 ms that a packet flow has started on a specific port associated with the latency-sensitive application. In this instance, the second LLD agent 228 may promptly instruct the router 229 via the control path 242 to immediately stop mirroring the data packets corresponding to the specific port. Similarly, the second LLD agent 228 may actively instruct the router 229 via the control path 242 to stop mirroring the data packets even before the router 229 mirrors all of the first P data packets of a packet flow associated with the latency-sensitive application. In the similar manner, the second LLD agent 228 may actively instruct the router 229 via the control path 242 to stop mirroring the data packets even before the router 229 mirrors all of first Q bytes of data of a packet flow associated with the latency-sensitive application. In still other embodiments, there may be no predefined time duration imposed on the router 229 to mirror data packets, but the second LLD agent 228 may simply instruct the router 229 to stop mirroring packets when it has detected a packet flow associated with the latency-sensitive application.

In another non-limiting embodiment of the present disclosure, the second LLD agent 228 may set one or more policies of the router 229 to partially mirror packet flows based on Access Control Lists (ACLs) rules. The ACLs may be injected into the router 229 using a control channel or using dynamic routing protocols. In general, an access control list (ACL) may be defined as an ordered list of rules applied to port numbers or IP addresses available on a network element. The ACLs may be injected into router 229 when needed. The ACLs are generally static in nature i.e., the ACLs once added remain operational until deleted. In ACL based partial port mirroring, the second LLD agent 228 may implement or inject one or more ACL rules into the router 229 via the control path 242 and the ACL rules may instruct the router 229 to start mirroring data packets of each packet flow associated with the latency-sensitive application and passing through any of the identified one or more network ports. The second LLD agent 228 may receive the mirrored packet flows from the router 229 and based on the mirrored packet flows it may identify at least one active network port of the one or more network ports associated with the latency sensitive application. The second LLD agent 228 may then configure downstream/upstream packet classifiers on the CMTS/CM for the identified at least one port. Once the downstream/upstream packet classifiers are configured on the CMTS/CM, the second LLD agent 228 may delete the injected ACL rules. In this implementation, the router 229 mirrors packet flows to the second LLD agent 228 until the downstream/upstream packet classifiers are configured on the CMTS/CM. Hence, this implementation provides a more reliable technique of configuring the classifiers on the CMTS/CM.

In this manner, the second LLD agent 228 detects packets flows dynamically using partial port mirroring and identifies the at least one active network port of the one or more network ports associated with the latency sensitive application. Once the at least one active network port is identified, the second LLD agent 228 may interact with the CMTS 232 and the CM 214 via control paths 244 and 266 respectively to program one or more packet classifiers on the CMTS 232 and CM 214. Specifically, the second LLD agent 228 may interact with the CMTS 232 via control path 244 and using the PCMM interface to program or add one or more downstream packet classifiers on the CMTS 232 such that for each of the at least one active network port, one downstream packet classifier is statically added on the CMTS 232. Similarly, the second LLD agent 228 may interact with the CM 214 via control path 246 and using the PCMM interface to program or add one or more upstream packet classifiers on the CM 214 such that for each of the at least one active network port, one upstream packet classifier is statically added on the CM 214. Each of the downstream and upstream packet classifiers is configured to separate low latency packets of a packet flow from high latency packets of the packet flow and enable propagation of the low latency packets faster than the high latency packets.

In one non-limiting embodiment, the latency-sensitive applications/services are enabled by default (plug and play)

by the operators. In this embodiment, the communication path 235 (as shown in FIGS. 4A-5B) through the MSO cloud 234 is eliminated, and the first LLD agent 226 itself intelligently identifies and effectuates low latency services using, e.g., artificial intelligence/machine learning algorithms.

In one non-limiting embodiment, each of the architectures as shown in FIGS. 2A to 5B may be capable of collecting statistics that may, for example, be used to provide real time performance information. In some embodiments, the first LLD agent 226 may host dashboards which present summary statistics, configuration panels for routers and other network elements like CCAPs, RPDs, cable modems, etc., or even in other parts of the network. Measurement instrumentation may be placed in such network elements to allow the collection of such statistics. The second LLD agent 228 may also collect its own statistics based on TCP handshake packets to calculate a round trip time of different loops. In some embodiments, these statistics, or the measurements used to calculate them, are forwarded to the first LLD agent 226. Aggregate information collected or calculated by the first LLD agent 226 may be forwarded to the subscriber device 212, and/or quality assurance systems or other network machine learning/AI engines hosted in the Operating Support System(s) 230 that may provide network optimization functions. In this manner, the devices, systems, and methods described in this specification may be used to provide Quality of Service monitoring and troubleshooting.

Thus, the techniques of the present disclosure dynamically learn packet flows which are active using optimized port mirroring and configure one or more downstream packet classifiers on CMTS and one or more upstream packet classifiers on CM only for the active packet flows so as to provision low latency services for the latency-sensitive applications in the CATV network. By using the optimized port mirroring, the techniques of the present disclosure effectively reduce the resource usage in CMTS, CM, and the second LLD agent.

Figure 6:
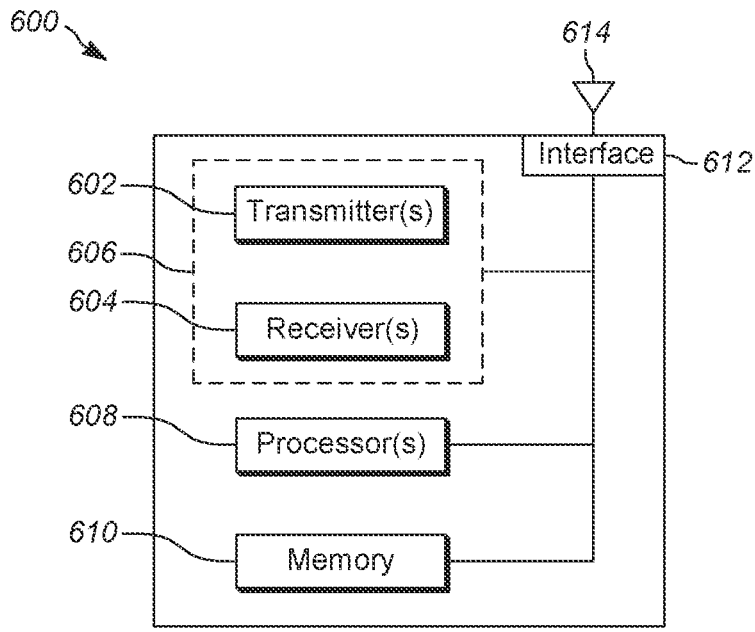
FIG. 6 shows an exemplary apparatus that may implement the techniques consistent with the present disclosure, in accordance with some embodiments of the present disclosure.

In the present disclosure, the terms like "packet classifier" and "LLD packet classifier" have been used interchangeably throughout the description. It may be noted that in some configurations/implementations, the "first LLD agent" may be referred to as "LLD Cloud Controller" and the "second LLD agent" may be referred to as "LLD Edge Compute". Further, the terms like "data packet" and "IP packet" have been used interchangeably throughout the description Referring now to FIG. 6 which shows a high-level block diagram of an apparatus 600 for provisioning low latency services in a CATV network compliant with LLD standard, in accordance with some embodiments of the present disclosure. The apparatus 600 may comprise at least one transmitter 602, at least one receiver 604, at least one processor 608, at least one memory 610, at least one interface 612, and at least one antenna 614. The at least one transmitter 602 may be configured to transmit data/information to one or more external nodes/devices using the antenna 614 and the at least one receiver 604 may be configured to receive data/information from the one or more external nodes/devices using the antenna 614. The at least one transmitter and receiver may be collectively implemented as a single transceiver module 606. In one non-limiting embodiment, the at least one processor 608 may be communicatively coupled with the transceiver 606, memory 610, interface 612, and antenna 614 for implementing the above-described techniques.

The at least one processor 608 may include, but not restricted to, microprocessors, microcomputers, micro-controllers, central processing units, state machines, logic circuitries, and/or any devices that manipulate signals based on operational instructions. A processor may also be implemented as a combination of computing devices, e.g., a combination of a plurality of microprocessors or any other such configuration. The at least one memory 610 may be communicatively coupled to the at least one processor 608 and may comprise various instructions, a list of low-latency applications, subscriber information, information related to one or more downstream and upstream packet classifiers, information related to network ports used by the low-latency applications, information related to topology of the CATV network, etc. The at least one memory 610 may include a Random-Access Memory (RAM) unit and/or a non-volatile memory unit such as a Read Only Memory (ROM), optical disc drive, magnetic disc drive, flash memory, Electrically Erasable Read Only Memory (EEPROM), a memory space on a server or cloud and so forth. The at least one processor 608 may be configured to execute one or more instructions stored in the memory 610.

The interfaces 612 may include a variety of software and hardware interfaces, for example, a web interface, a graphical user interface, an input device-output device (I/O) interface, a network interface and the like. The I/O interfaces may allow the apparatus 600 to communicate with one or more external nodes/devices either directly or through other devices. The network interface may allow the apparatus 600 to interact with one or more networks either directly or via any other network(s).

In one non-limiting embodiment, the apparatus 600 may be the second LLD agent 228 which implements the techniques of optimized port mirroring in the router 229 and programs classifiers on the CMTS 232 and the CM 214. However, the present disclosure is not limited thereto and in general, same and similar apparatus may be used to implement the functionalities of various network elements including the first LLD agent 226, the router 229, the CMTS 232, the CM 214, the subscriber device 212 etc.

Figure 7:
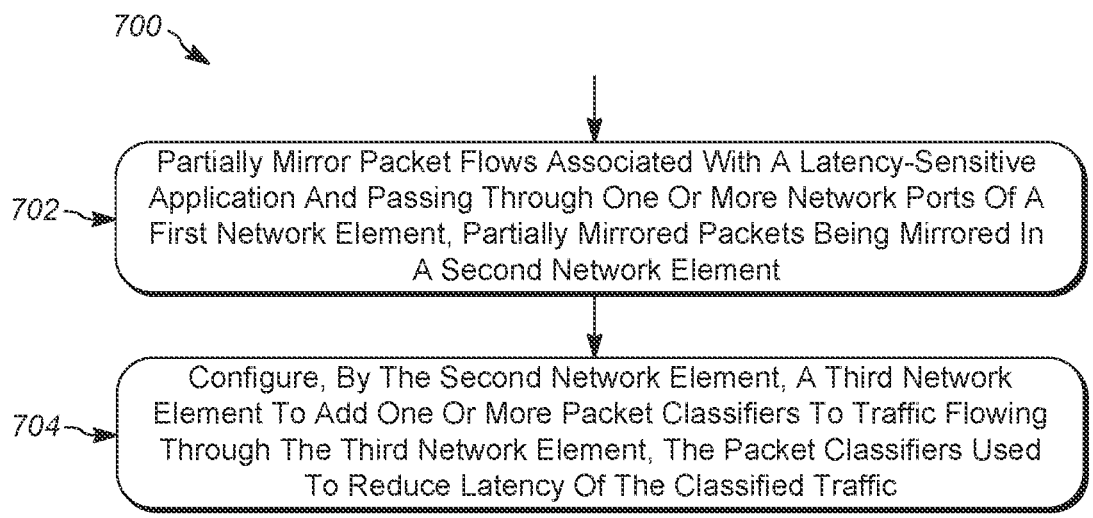
FIG. 7 shows an exemplary method for provisioning low latency services, in accordance with some embodiments of the present disclosure.

FIG. 7 shows a flowchart illustrating a method 700 for provisioning low latency services, in accordance with some embodiments of the present disclosure. The various operations of the method 700 may be performed with the help of the apparatus 600 or the second LLD agent 228.

As illustrated in FIG. 7, the method 700 may include, at a block 702, partially mirroring packet flows associated with a latency-sensitive application and passing through one or more network ports of a first network element, partially mirrored packets being mirrored in a second network element. For example, the at least one processor 608 may enable the first network element to partially mirroring packet flows associated with a latency-sensitive application and passing through one or more network ports of the first network element, partially mirrored packets being mirrored in the second network element.

The operations of block 702 may be performed in a number of ways. In other words, the at least one processor 608 may be configured to partially mirror packet flows associated with the latency-sensitive application in number of ways. In one non-limiting embodiment, the at least one processor 608 may enable the first network element to mirror only a pre-defined number of data packets of each packet flow passing through the first network element that are associated with the latency-sensitive application. In another non-limiting embodiment, the at least one processor 608 may enable the first network element to mirror only a pre-defined amount of data bytes of each packet flow passing through the first network element that are associated with the latency-sensitive application. In another non-limiting embodiment, the at least one processor 608 may enable the first network element to mirror data packets, for only a predefined duration, of each packet flow passing through first network element that are associated with the latency-sensitive application. In yet another non-limiting embodiment, the at least one processor 608 may implement one or more access control list (ACL) rules in the first network element.

The method 700 may also include, at block 704, configuring, by the second network element, a third network element to add one or more packet classifiers to traffic flowing through the third network element, the packet classifiers used to reduce latency of the classified traffic. For example, the at least one processor 608 may configure a third network element to add one or more packet classifiers to traffic flowing through the third network element, the packet classifiers used to reduce latency of the classified traffic.

In one non-limiting embodiment, the method 700 may include configuring one or more downstream packet classifiers on at least one port of a Cable Modem Termination System (CMTS) 232 of a Cable Television (CATV) network. For example, the at least one processor 608 may configure the one or more downstream packet classifiers on at least one port of the CMTS 232.

In another non-limiting embodiment, the method 700 may include configuring one or more upstream packet classifiers on at least one port of a Cable Modem (CM) 214 of the CATV network. For example, the at least one processor 608 may configure one or more upstream packet classifiers on at least one port of the CM 214.

In one non-limiting embodiment, the method 700 may include removing the one or more ACL rules from the first network element after configuring the one or more downstream and upstream packet classifiers. In one non-limiting embodiment, each downstream and upstream packet classifier is configured to separate low latency packets of a packet flow from high latency packets of the packet flow and enable propagation of the low latency packets faster than the high latency packets.

In one non-limiting embodiment, the first network element may include the wireless router 229 which is located north of the CMTS 232 and the latency-sensitive application may comprise a gaming application (e.g., an online multi-player gaming application), a video conferencing application, a video streaming application, but not limited thereto. Also, the one or more network ports may comprise one or more port numbers, or one or more port ranges, or both associated with latency-sensitive application. In one non-limiting embodiment, the second network element may include the second LLD agent 228 operatively connected to the router 229. The third network element may include at least one edge device operatively coupled to the router 229 in a communications network (e.g., the CATV network). The at least one edge device may include at least one of a Cable Modem Termination System (CMTS) 232 and a cable modem (CM) 214.

In one non-limiting embodiment, the second LLD agent 228 is configured to receive partially mirrored packets from the router 229 and to use the partially mirrored packets to instruct the at least one edge device (e.g., CMTS 232 and/or CM 214) to selectively add classifiers to a subset of packets propagated onto the communications network, the classifiers used by the network to reduce the latency of the classified subset of packets. In one non-limiting embodiment, the second LLD agent packets that are partially mirrored may be one of: (i) only a pre-defined number of data packets of each packet flow passing through the router 229; (ii) only a pre-defined amount of data bytes of each packet flow passing through the router 229; (iii) data packets mirrored for only a predefined duration; and (iv) data packets mirrored only until the second LLD agent instructs the at least one edge device.

Figure 8:
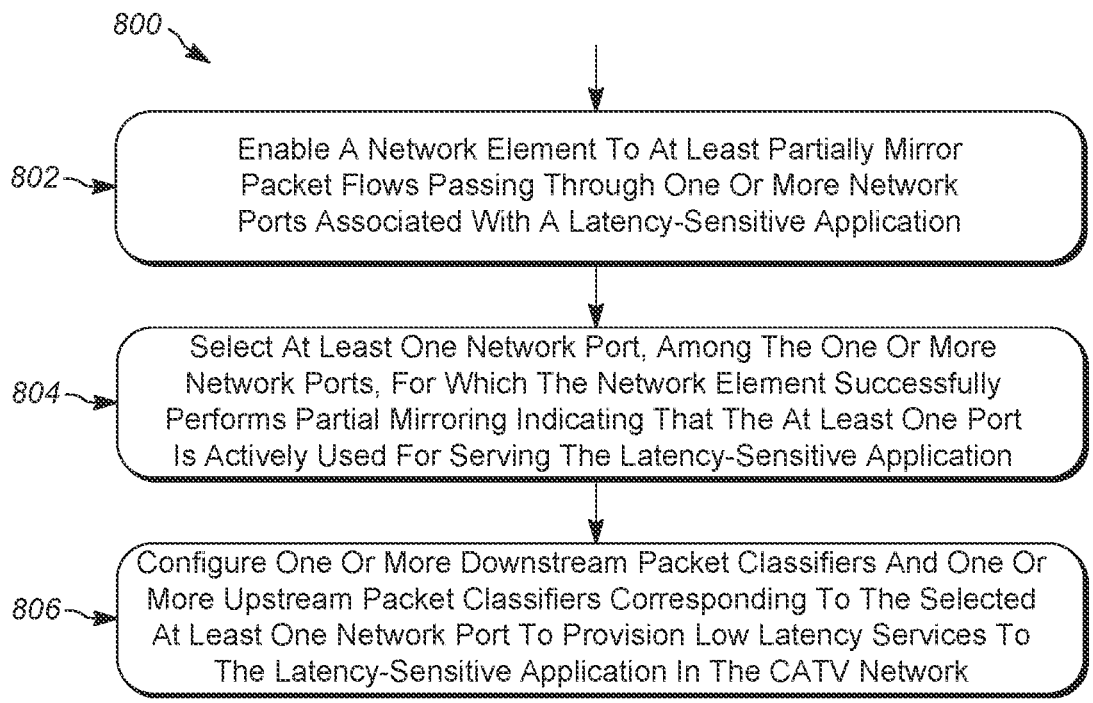
FIG. 8 shows an exemplary method for provisioning low latency services in a CATV network compliant with Low Latency Data Over Cable Service Interface Specification (DOCSIS) standard, in accordance with some embodiments of the present disclosure.

FIG. 8 shows a flowchart illustrating a method 800 for provisioning low latency services in a CATV network compliant with Low Latency DOCSIS (LLD) standard, in accordance with some embodiments of the present disclosure. The various operations of the method 800 may be performed with the help of the apparatus 600 or the second LLD agent 228.

As illustrated in FIG. 8, the method 800 may include, at a block 802, enabling a network element to at least partially mirror packet flows passing through one or more network ports associated with a latency-sensitive application. In one non-limiting embodiment, the network element may include the wireless router 229 which is located north of the CMTS 232. The operations of block 802 may be performed in a number of ways, as discussed above in the present disclosure. The method 800 may also include, at block 804, selecting at least one network port, among the one or more network ports, for which the network element 229 successfully performs partial mirroring indicating that the at least one port is actively used for serving the latency-sensitive application. The method 800 may further include, at block 806, configuring one or more downstream packet classifiers and one or more upstream packet classifiers corresponding to the selected at least one network port to provision low latency services to the latency-sensitive application in the CATV network.

In one non-limiting embodiment, the operation of block 806 may include configuring the one or more downstream packet classifiers on the selected at least one port of the CMTS 232 of the CATV network. In another non-limiting embodiment, the operation of block 806 may include configuring the one or more upstream packet classifiers on the selected at least one port of the CM 214 of the CATV network. Each downstream and upstream packet classifier may be configured to separate low latency packets of a packet flow from high latency packets of the packet flow and enable propagation of the low latency packets faster than the high latency packets.

As noted previously, for a communications network such as any of those shown in FIGS. 1A-5B to provide low latency service to and from a subscriber, the CMTS 102, 232 and/or remote device 153, as well as the cable modems 154 should preferably be capable of providing classifiers to packets eligible for low latency service. According to preferred embodiments of the present disclosure, these classifiers may be implemented by using PacketCable Multimedia (PCMM) gates. A PacketCable Multimedia Gate, defined by the PacketCable Multimedia Specification, is a logical representation of a policy decision that has been installed on a CMTS (or on a remote device/cable modem). Specifically, in preferred embodiments, these gates may be used to control access by a single IP flow to low latency services. Preferably, the gates are unidirectional; a single Gate controls access to a flow in either the upstream or the downstream directions, but not both. Thus, for a bi-directional IP session, two Gates are required, one for the upstream direction and one for the downstream direction.

Each logical Gate is identified by a unique Gate ID and that Gate ID is preferably associated with a plurality of traffic flow identifiers i.e., tuples. In some embodiments, for example, the traffic flow identifiers in the tuples associated with a gate are drawn from headers of packets sent in data flows according to one or more transmission protocols, such as the Internet Protocol/Transmission Control Protocol (IP-TCP) and/or User Datagram Protocol (UDP). In a preferred embodiment, for example, the tuple may comprise the source/destination IP addresses of a flow of packets along with the source/destination ports associated with that flow. In other preferred embodiments, other identifiers may be used such as IPv.6 flow labels, etc.

Figure 9A:
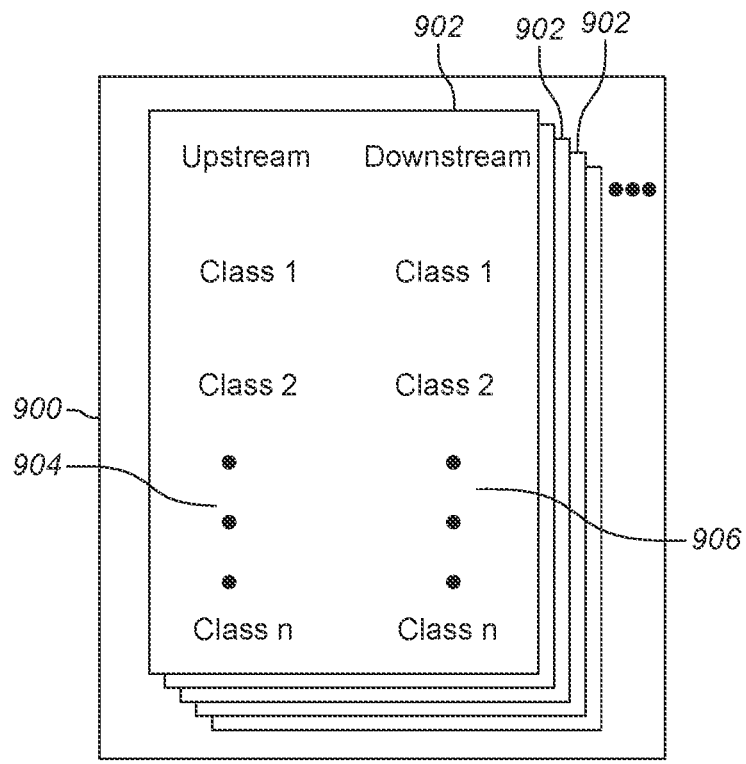
FIG. 9A shows an exemplary client device enabling a plurality of Low-Latency applications.

FIG. 9A shows an exemplary embodiment of providing low latency service to each of a plurality of subscribers 900. Each subscriber may be permitted to enable a specified number of applications 902 for low latency service, and each application 902 may be permitted "n" number of upstream classifiers 904 and "n" number of downstream classifiers 906. In a preferred embodiment, each classifier is implemented as a single gate. Notably, most existing hardware devices such as CMTS devices, remote devices such as RMDs RPDs, etc. are only capable of implementing a limited number of gates. For example, a typical CMTS may only be designed to enable 40,000 gates within its chassis. Although this number may seem significant, each CMTS may serve tens of thousands of subscribers; since each low-latency application of a subscriber requires two gates to be implemented at the CMTS (upstream and downstream), then even 40,000 gates is extremely restrictive. For example, if a service provider allows each subscriber 900 to support five low-latency applications 902, each application being permitted ten classifiers (five each in the upstream and downstream, respectively), then supporting 20,000 low latency subscribers would require up to a million classifiers and a million gates. Even assuming that not every subscriber would require low latency services, a CMTS with only 40,000 gates could only provide such services to 700 (out of 20,000) subscribers-clearly an insufficient number.

Disclosed are preferred embodiments that efficiently manage classifiers for low latency service so as to increase the number of subscribers/applications that may simultaneously use low latency services given the limited number of gates available to a CMTS and/or remote device such as an RMD. First, each low latency application is associated with a port number or a port range for communicating packets of the low latency application. For example, an application may communicate low latency traffic on UDP port 40, or UDP ports 40-50, or UDP ports 40, 45-50, etc. In a preferred embodiment, each single classifier is associated with either a single port of an application or a contiguous range of ports for the application e.g., port 40, port 40-50 etc. In some embodiments, if an application utilizes discontinuous ports or port ranges that are close to each other by a specified threshold, ports or port ranges may be consolidated by associating the application with a range of ports that encompasses one or more of the discontinuities.

A subscriber database may store a list of low latency applications enabled by each subscriber, along with a list of classifiers (gate IDs) associated with each such low latency application as well as the port or port range of the gate. The subscriber database may in some preferred embodiments be maintained (or accessible to) the cloud compute device or first LLD agent 226 as shown in FIGS. 2A-5B. In other embodiments the subscriber database may be maintained (or accessible to) the edge compute device or second LLD agent 228 as shown in FIGS. 2A-5B. In either embodiment, each of these devices may interact with client devices/subscribers to activate or otherwise enable low latency applications as described below, and update the database to reflect the added low-latency application. In one embodiment, the first LLD agent 226 determines the port information associated with the application to be activated, generates one or more classifiers consisting of port/port ranges for the application and communicates this information to the second LLD agent 228, which implements/adds the classifier(s) on the CMTS through the use of a PCMM Policy. The implementation of the PCMM Policy in the CMTS generates the Gate and GateID.

Notably, in many instances different low latency applications may use the same ports. For example, for many games the X-box gaming service uses UDP port 88, regardless of which game is being played. Thus, ordinarily in such circumstances when a new application is added, the upstream/downstream port ranges associated with the application are assigned new classifier(s)/gates, wasting the limited number of gates available at the CMTS.

Figure 9B:
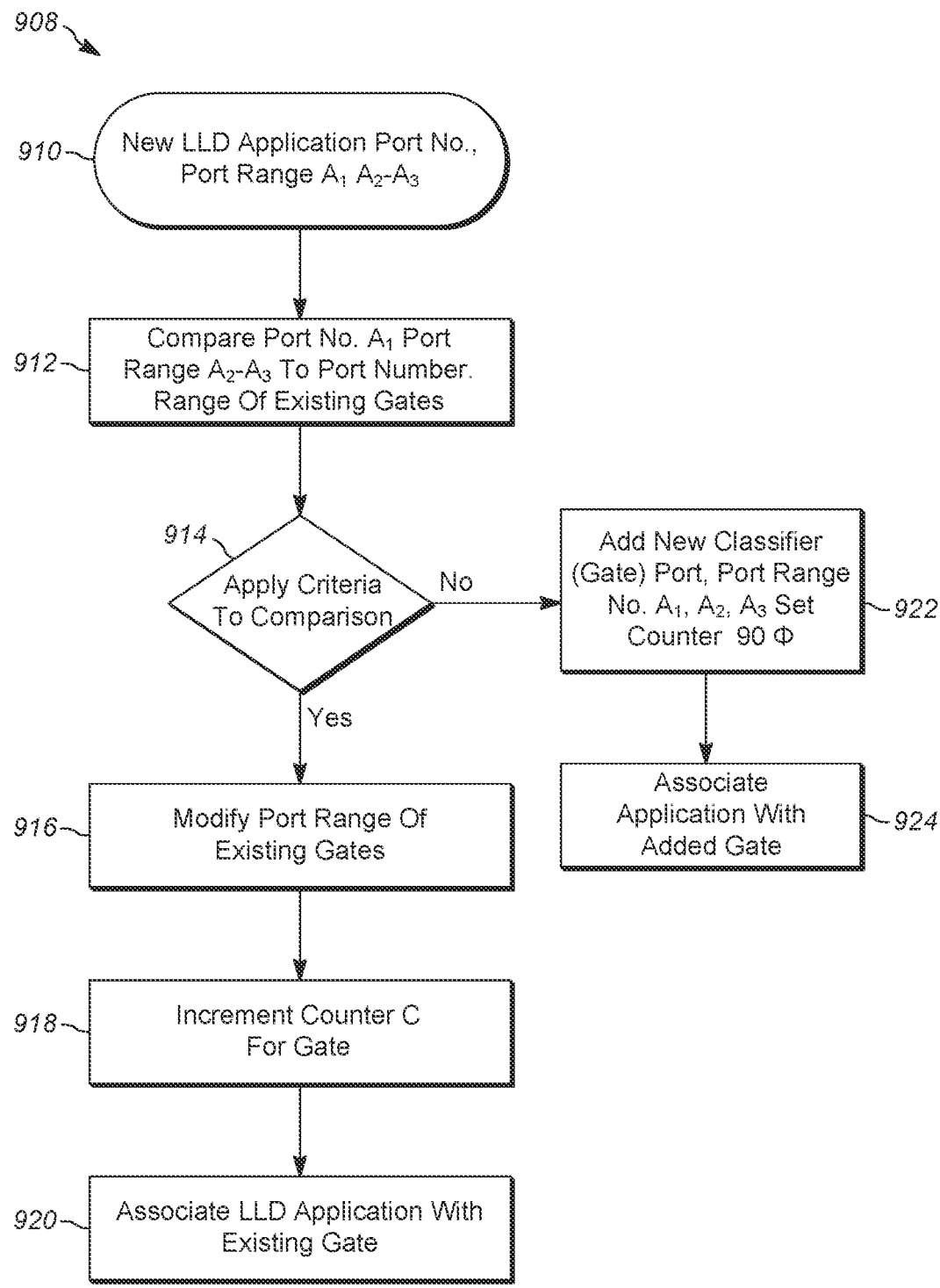
FIG. 9B shows an exemplary method of assigning classifiers when a Low-Latency application is enabled.

FIG. 9B shows a method 908 for efficiently managing classifiers in a manner increases the number of subscribers/applications that may simultaneously use low latency services given the limited number of gates available to a CMTS and/or remote device such as an RMD. In some embodiments, the method 908 may be implemented by the first LLD agent 226, but this of ordinary skill in the art will recognize that other embodiments may implement this disclosed method in any device or apparatus (or combination of such) that communicates directly or indirectly with both a client device to activate an LLD application as well as a CMTS to program the CMTS with the necessary classifiers to recognize traffic from the activated LLD application.

At step 910, the first LLD agent 226 receives a communication of a new or added LLD application, along with its associated port or port range. At step 912, these ports/port ranges are compared to those associated with existing gates or classifiers in the database maintained by the first LLD agent 910. Then at step 914, a criterion or criteria are applied to the comparison to determine whether a new classifier does not need to be added in order to enable the CMTS to recognize data packets of that LLD application. For example, the comparison may determine that the port or port range associated with the newly added application duplicates a port of an existing LLD application of the client device already stored in the database. In that circumstance, criteria would be met because the CMTS would already have a programmed classifier that would properly classify the traffic from the new LLD application as being eligible for LLD service, hence the first LLD agent 226 would not need to create a new classifier. Similarly, the comparison may determine that the port or port range associated with the new LLD application overlaps that of an existing classifier. In that circumstance, the first LLD agent 226 could avoid adding a new classifier by expanding the port range of the existing classifier. On the other hand, if the port or port range of the newly added LLD application does not duplicate, fall within, or overlap the port range associated with an existing classifier, the criteria would not be met i.e., a new classifier should be associated with the new LLD application and the CMTS programmed accordingly Thus, if at step 914 the comparison shows that the criteria is not satisfied, then a new classifier (gate) is assigned to the port/port ranges of the new LLD application and a counter "c" associated with the gate (described later) will be set to zero. At step 924 the added classifier is associated with the new application by updating the database and by instructing the CMTS to add the classifier. In some embodiments this latter procedure may be performed indirectly by communicating the classifier to the second LLD agent 228. When a new classifier is added, the counter "c" can be incremented to 1 when the CMTS has successfully added the classifier, since in some cases the CMTS may return an error and in that instance the counter would not be incremented until the classifier is successfully added.

Returning to step 914, if one or more of the criteria is satisfied, therefore indicating that a new classifier does not need to be added, then at optional step 916 an existing classifier may be modified if necessary to change (e.g., expand) its associated port or port range. At step 918, the counter "c" associated with the existing classifier will be incremented by one, thus indicating the number of applications associated with the existing (or modified) classifier. Then at step 920 the newly added LLD application will be associated with the existing gate in the database and if the existing classifier were modified, the CMTS or other edge device such as an RMD would be instructed to use the modified classifier as a replacement for the classifier that was modified.

With respect to steps 918 and 920, in order to modify a classifier on the CMTS, some embodiments may create a new replacement classifier representing the modified classifier and implement that on the CMTS after deleting the old classifier, and the counter for the new, replacement classifier can be set to the value of the counter of the replaced classifier, incremented by one once the replacement classifier has been successfully added.

As indicated earlier, step 914 may implicate one or more different criteria. For example, one possible criterion may be whether there is an "exact match" between the port/port ranges of the newly added application and those of a classifier already in the database. For example, if the newly added application and an existing classifier both use port 40, or ports 40-45, this criterion would be met. Another criterion would be a subset match where the newly added application has a port or port range within the port range of an existing classifier. In either of these circumstances, a new classifier would not be needed. Still alternatively, another criterion may implement a superset match, indicating that the port or port range of the newly added application partially overlaps or is immediately next to that of an existing classifier. For example, the newly added application could have a port range of 40-50 while an existing classifier could have a port range of 40-45. In this circumstance, the existing classifier may be modified to be associated with the port range of the newly added application. Still another criterion may be an "offset" match where the newly added application has an associated port range that overlaps or is contiguous to that of an existing classifier. For example, the newly added application could have a port range of 45-50 while an existing classifier has an associated port range of 40-44, or the newly added application could have a port range of 40-50 while an existing classifier has an associated port range of 45-50. In this circumstance the existing classifier could be expanded to encompass the port range associated with the newly added application. Those of ordinary skill in the art will appreciate that this last example of an offset match could be modified to allow slight discontinuities (i.e., an existing classifier has an associated port range of 40-45 and the newly added application has an associated port range of 48-55. Such an embodiment would allow further efficiency in the use of classifiers at the potential cost of assigning low latency service to traffic that does not qualify for it, but so long as the discontinuities are small this may be an acceptable trade-off. Those of ordinary skill in the art will recognize that, since step 914 may apply multiple different criteria, the decision in step 916 as to whether or not to optionally modify an existing classifier will depend on which criterion are met.

Figure 9C:
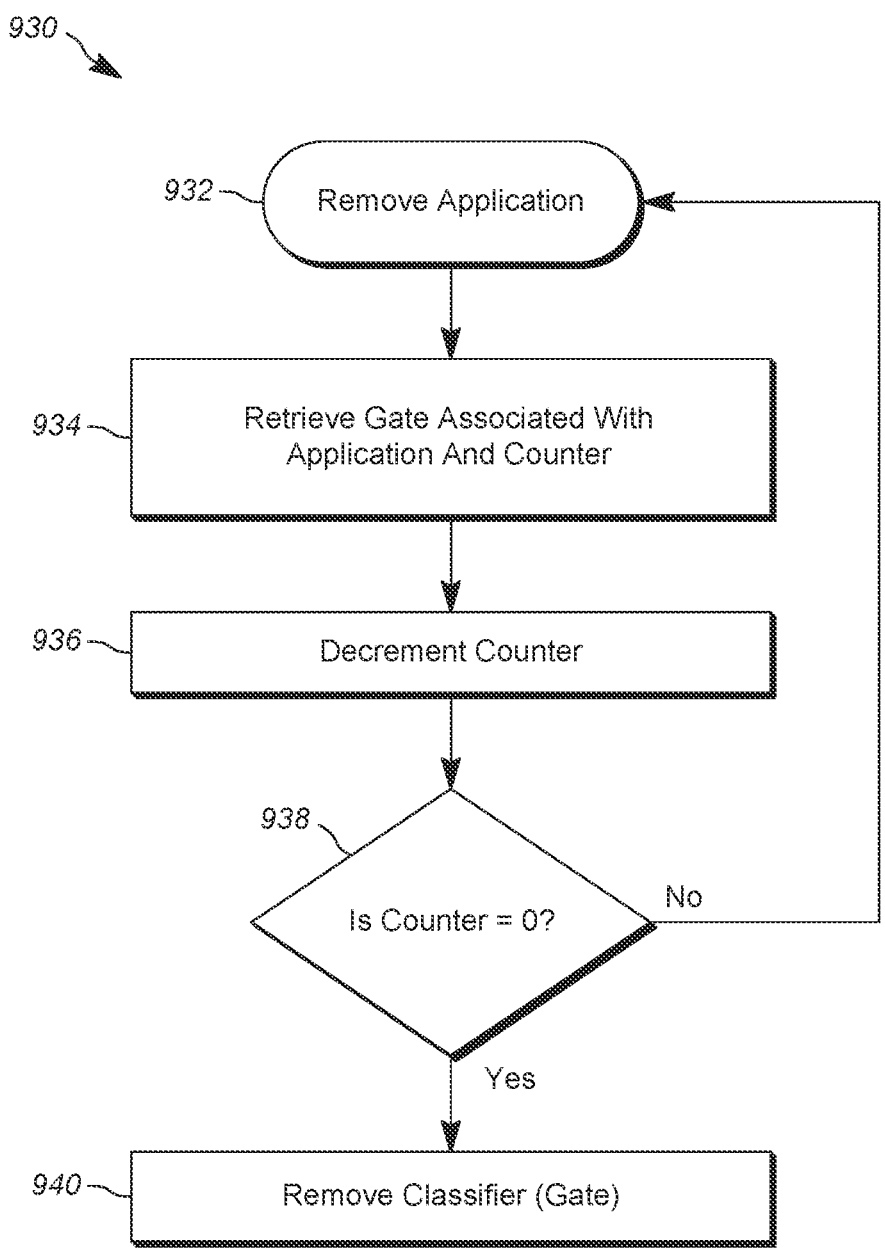
FIG. 9C shows an exemplary method of assigning classifiers when a Low-Latency application is disabled.

FIG. 9C shows a method 930 that may be implemented when an LLD application is disabled or removed by a client. Specifically, at 932 an instruction is received (at the first LLD agent 226 for example) to remove an LLD application. At step 934, the classifier/gate associated with that application is retrieved from the database, along with the value of the counter associated with the classifier. At step 936 the value of the counter in the database is decremented by one. At step 938, if the decremented counter has a value of zero, the classifier is removed, else the procedure returns to step 932 until such time that the client device/subscriber removes another application.

In still further alternate embodiments, in addition to implementing a counter, when an application is removed, the classifier associated with that removed application may be again modified to revert to a previous state, or otherwise remove port ranges from low latency service that are not associated with any remaining LLD applications used by the client device. This may be accomplished by maintaining a record of port ranges associated with each application associated with each classifier. In still other embodiments, when an existing classifier is modified based on a newly-added LLD application, the modified existing classifier may then be compared to other classifiers in the database according to steps 912-924 of FIG. 9B in order to see whether further consolidation of classifiers is possible.

The order in which the various operations of the methods that are described is not intended to be construed as a limitation, and any number of the described method blocks can be combined in any order to implement the method. Additionally, individual blocks may be deleted from the methods without departing from the spirit and scope of the subject matter described herein. Furthermore, the methods can be implemented in any suitable hardware, software, firmware, or combination thereof.

The various operations of methods described above may be performed by any suitable means capable of performing the corresponding functions. Generally, where there are operations illustrated in Figures, those operations may have corresponding counterpart means-plus-function components. It may be noted here that the subject matter of some or all embodiments described with reference to the figures of this application may be relevant for the method and apparatus and the same is not repeated for the sake of brevity.

In a non-limiting embodiment of the present disclosure, one or more non-transitory computer-readable media may be utilized for implementing the embodiments consistent with the present disclosure. A computer-readable media refers to any type of physical memory (such as the memory 610) on which information or data readable by a processor may be stored. Thus, a computer-readable media may store one or more instructions for execution by the at least one processor 608, including instructions for causing the at least one processor 608 to perform steps or stages consistent with the embodiments described herein. Certain aspects may comprise a computer program product for performing the operations presented herein. For example, such a computer program product may comprise a computer readable media having instructions stored (and/or encoded) thereon, the instructions being executable by one or more processors to perform the operations described herein. For certain aspects, the computer program product may include packaging material.

The various illustrative logical blocks, modules, and operations described in connection with the present disclosure may be implemented or performed with a general-purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general-purpose processor may include a microprocessor, but in the alternative, the processor may include any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

As used herein, a phrase referring to "at least one" or "one or more" of a list of items refers to any combination of those items, including single members. As an example, "at least one of: a, b, or c" is intended to cover: a, b, c, a-b, a-c, b-c, and a-b-c. The terms "a", "an" and "the" mean "one or more", unless expressly specified otherwise. The terms "including", "comprising", "having" and variations thereof, when used in a claim, is used in a non-exclusive sense that is not intended to exclude the presence of other elements or steps in a claimed structure or method, unless expressly specified otherwise.

Finally, the language used in the specification has been principally selected for readability and instructional purposes, and it may not have been selected to delineate or circumscribe the inventive subject matter. It is therefore intended that the scope of the disclosure be limited not by this detailed description, but rather by any claims that issue on an application based here on. Accordingly, the embodiments of the present disclosure are intended to be illustrative, but not limiting, of the scope of the invention, which is set forth in the appended claims.

The invention claimed is:

1. A device comprising at least one Low-Latency DOCSIS (LLD) agent having an associated one or more processors, the at least one LLD agent operatively connected to a client device and an edge device that together exchange data pursuant to the DOCSIS protocol, and operatively connected to a database that monitors at least one first classifier used by the edge device to provide low latency service to at least one first LLD application activated on the client device, the LLD agent configured to, in response to the client device activating a second LLD application on the client device, selectively and alternately either modify the at least one first classifier used by the edge device or add a second classifier to the edge device and monitor the second classifier in the database.

2. The device of claim 1 where the edge device is a CMTS.

3. The device of claim 1 where the edge device is a remote device in a distributed access architecture.

4. The device of claim 1 where the first classifier has an associated first port range of at least one port and the second LLD application has a second associated port range of at least one port, and the at least one LLD agent is configured to selectively and alternately either modify the at least one first classifier used by the edge device or add a second classifier to the edge device based on a comparison the first associated port range to the second associated port range.

5. The device of claim 4 where each at least one first classifier in the database has an associated counter incremented based on the comparison.

6. The device of claim 5 where the counter is decremented based on the client device deactivating at least one of the first LLD application and the second LLD application.

7. The device of claim 4 where the comparison determines whether each of at least one criteria are met, and the at least one LLD agent is configured to selectively and alternately either modify the at least one first classifier used by the edge device or add a second classifier to the edge device based on which, if any, at least one criteria are met.

8. The device of claim 1 configured to enable a single classifier to be associated with more than one LLD application.

9. The device of claim 8 configured to selectively change the number of LLD applications associated with the single classifier.

10. The device of claim 9 where the number of LLD applications associated with the single classifier is implemented by a counter.

11. A method for providing low latency service to at least one application enabled on a client device that communicates with an edge device to exchange data pursuant to the DOCSIS protocol, the method comprising:
receiving a message from the client device to enable a new LLD application operating on the client device;
in response to the message, configuring the edge device to enable Low-Latency service for the new LLD application by selectively and alternately either adding a new classifier to the edge device or modifying an existing first classifier used by the edge device.

12. The method of claim 11 where the edge device is a CMTS.

13. The method of claim 11 where the edge device is a remote device in a distributed access architecture.

14. The method of claim 11 where the existing classifier has an associated first port range of at least one port and the new LLD application has a second associated port range of at least one port, and step of selectively and alternately either adding a new classifier to the edge device or modifying an existing first classifier used by the edge device is based on a comparison the first associated port range to the second associated port range.

15. The method of claim 14 where each at least one existing classifier in the database has an associated counter incremented based on the comparison.

16. The method of claim 15 where the counter is decremented based on the client device deactivating at least one of the existing LLD application and the new LLD application.

17. The method of claim 14 where the comparison determines whether each of at least one criteria is met, and the step of selectively and alternately either adding a new classifier to the edge device or modifying an existing first classifier used by the edge device is based on which, if any, at least one criteria are met.

18. The method of claim 11 configured to enable a single classifier to be associated with more than one LLD application.

19. The method of claim 18 configured to selectively change the number of LLD applications associated with the single classifier.

20. The method of claim 19 where the number of LLD applications associated with the single classifier is implemented by a counter.

* * * * *